United States Patent
Park et al.

(10) Patent No.: US 10,889,232 B2
(45) Date of Patent: Jan. 12, 2021

(54) VEHICLE CONTROL METHOD THAT COMPARES A LIGHT DISTRIBUTION PATTERN EXTRACTED FROM AN IMAGE CAPTURED BY A CAMERA WITH A REFERENCE LIGHT DISTRIBUTION PATTERN

(71) Applicant: ZKW Group GmbH, Wieselburg (AT)

(72) Inventors: Sangshin Park, Seoul (KR); Taeyoung Na, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 163 days.

(21) Appl. No.: 15/944,169

(22) Filed: Apr. 3, 2018

(65) Prior Publication Data

US 2018/0290583 A1   Oct. 11, 2018

(30) Foreign Application Priority Data

Apr. 10, 2017   (KR) .......................... 10-2017-0046215

(51) Int. Cl.
    *B60Q 1/08*      (2006.01)
    *B60Q 1/16*      (2006.01)
    *G01M 11/06*     (2006.01)
    *B60Q 11/00*     (2006.01)
    *F21S 41/60*     (2018.01)

(52) U.S. Cl.
    CPC .............. *B60Q 1/085* (2013.01); *B60Q 1/16* (2013.01); *B60Q 11/005* (2013.01); *G01M 11/064* (2013.01); *B60Q 2300/312* (2013.01); *B60Q 2300/332* (2013.01); *B60Q 2300/334* (2013.01); *F21S 41/60* (2018.01)

(58) Field of Classification Search
    None
    See application file for complete search history.

(56) References Cited

U.S. PATENT DOCUMENTS

| 2007/0195270 A1* | 8/2007 | Hull ........................ F21S 8/003 352/49 |
| 2009/0046474 A1* | 2/2009 | Sato ...................... F21S 41/675 362/466 |

(Continued)

FOREIGN PATENT DOCUMENTS

| DE | 102011109440 | 4/2012 |
| DE | 102014102757 | 9/2015 |

(Continued)

OTHER PUBLICATIONS

Partial European Search Report in Application No. 18166478.0, dated Sep. 6, 2018, 12 pages.

(Continued)

*Primary Examiner* — Borna Alaeddini
(74) *Attorney, Agent, or Firm* — Fish & Richardson P.C.

(57) ABSTRACT

A method for controlling a vehicle that includes at least one camera and a lamp, the method including: controlling the at least one camera to capture at least one image of an area in front of the vehicle; extracting, from the at least one image, a light distribution pattern formed by the lamp in the area in front of the vehicle; and performing at least one control related to the extracted light distribution pattern, based on a comparison result obtained by comparing the extracted light distribution pattern with a reference light distribution pattern.

18 Claims, 27 Drawing Sheets

(56) References Cited

U.S. PATENT DOCUMENTS

2016/0081160 A1* 3/2016 Vangeel ............... H05B 47/105
　　　　　　　　　　　　　　　　　　　　　　　315/152
2016/0152178 A1* 6/2016 Peterson .................. B60Q 3/80
　　　　　　　　　　　　　　　　　　　　　　　315/77

FOREIGN PATENT DOCUMENTS

| EP | 2305514 | 4/2011 |
| EP | 2689966 | 1/2014 |
| JP | 2013163433 A | 8/2013 |
| KR | 20110037747 A | 4/2011 |

OTHER PUBLICATIONS

Extended European Search Report in European Appln. No. 18166478.0, dated Feb. 28, 2019, 12 pages.

* cited by examiner

FIG. 1
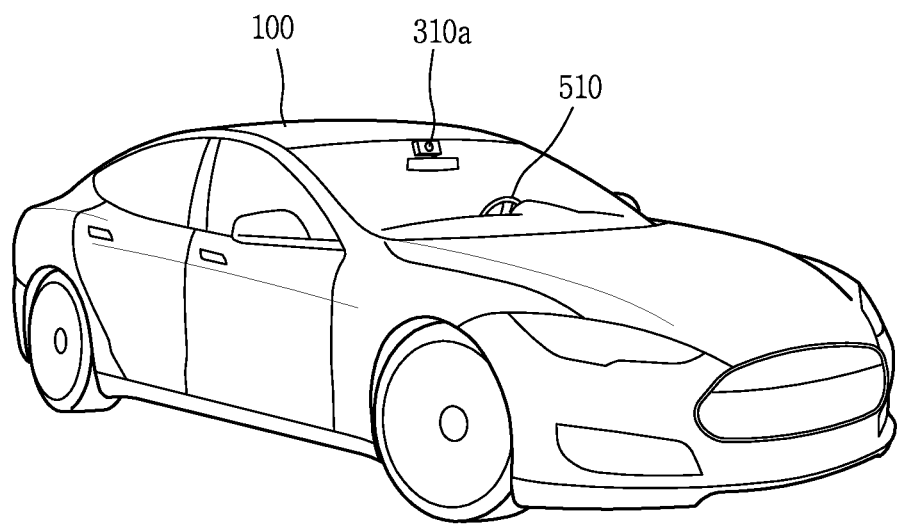
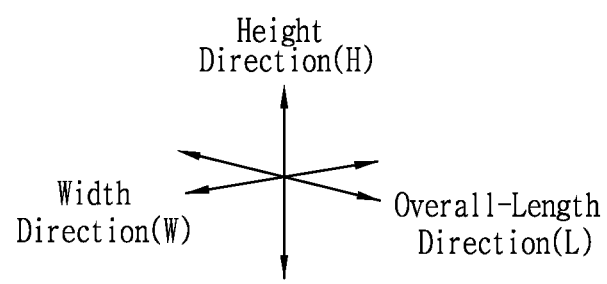

FIG. 9
(a) Pedestrian mode
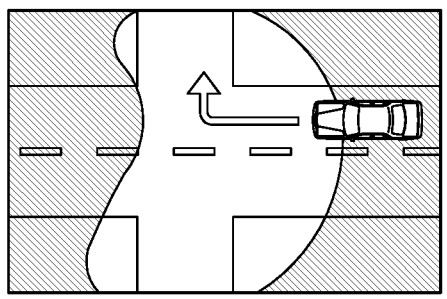
(b) Town mode
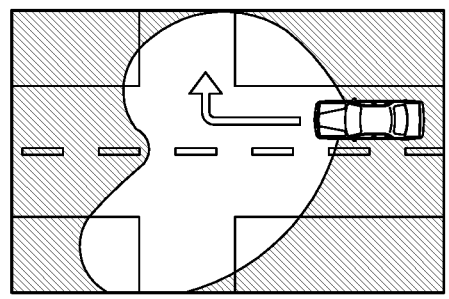
(d) Adverse Weather mode
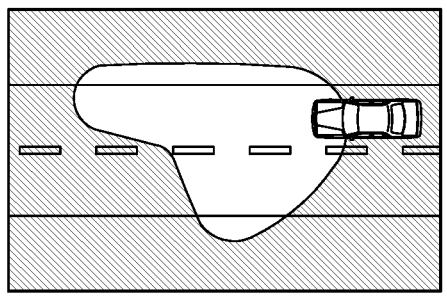
(c) Country mode
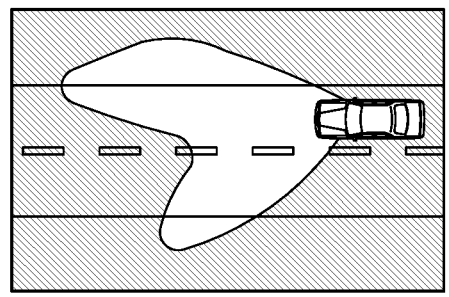
(e) Motorway mode
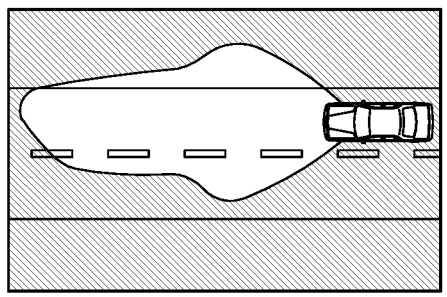

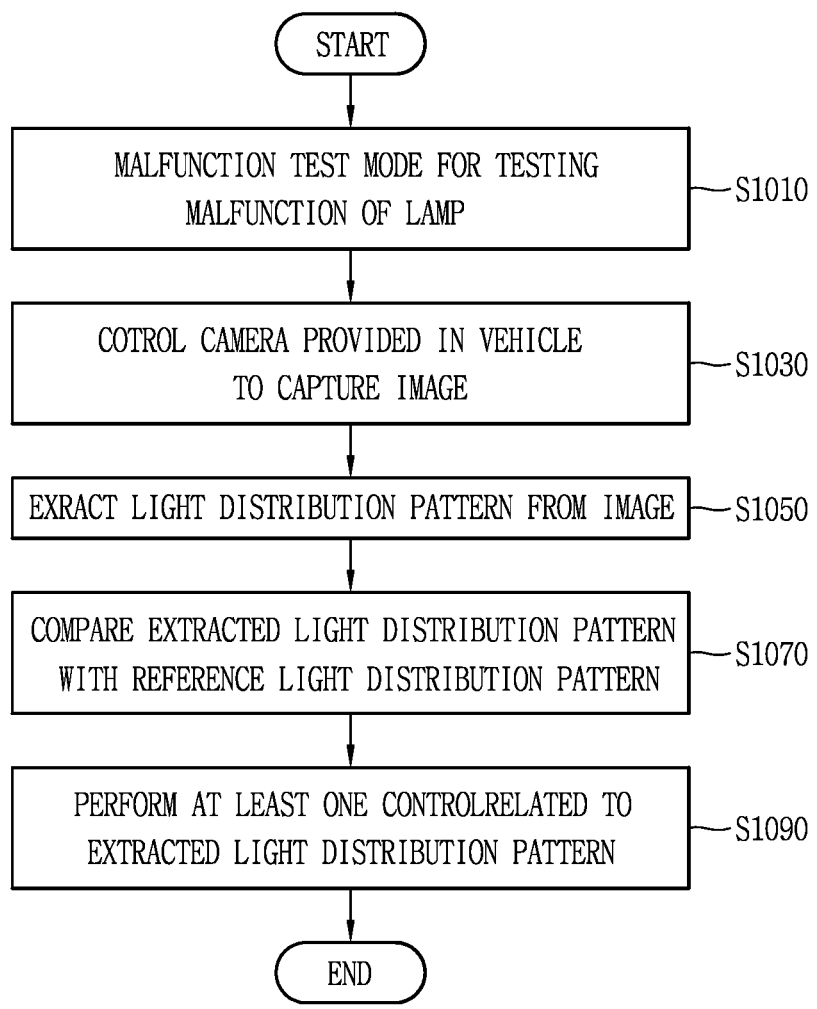

FIG. 24
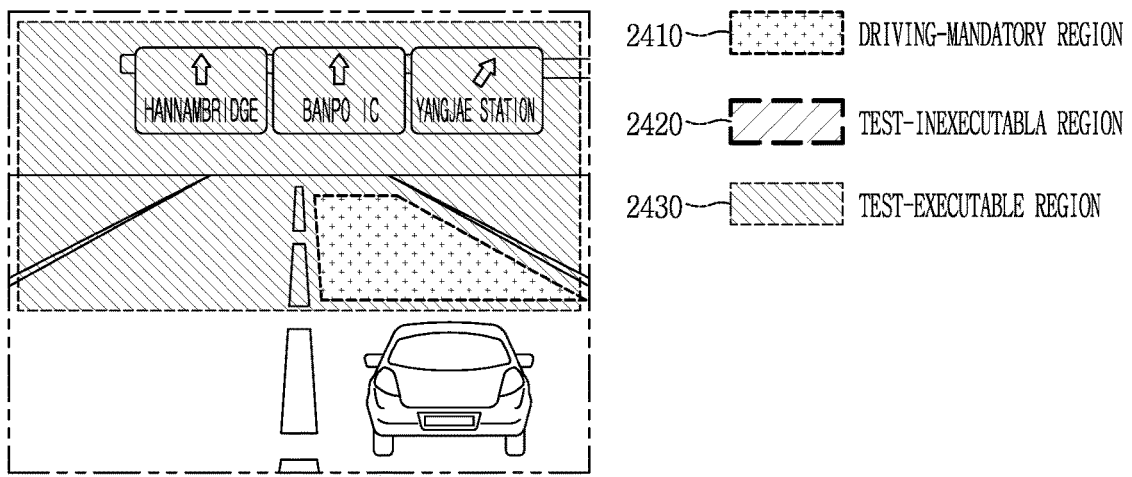
2410 — DRIVING-MANDATORY REGION
2420 — TEST-INEXECUTABLA REGION
2430 — TEST-EXECUTABLE REGION
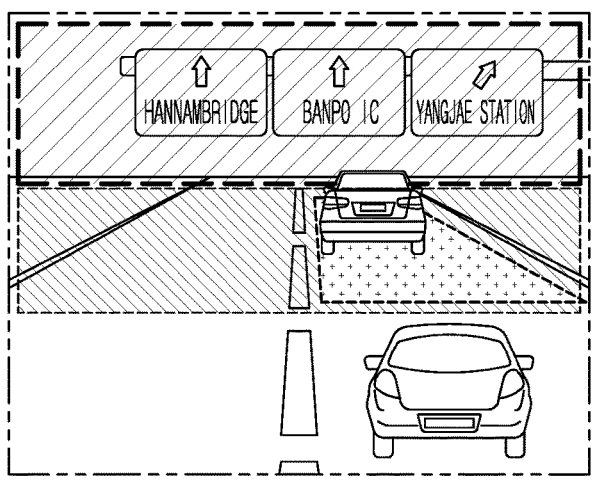
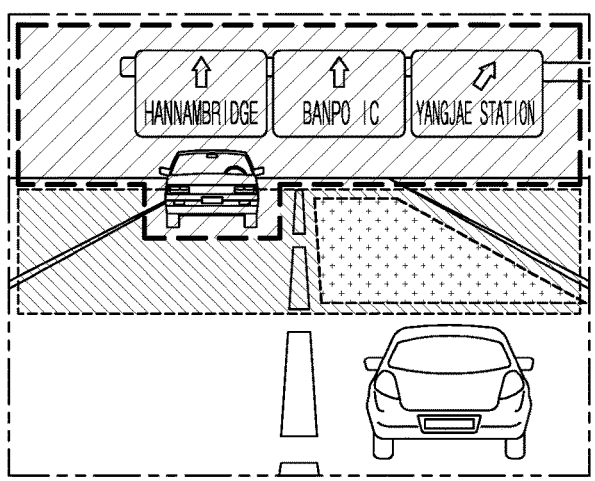

VEHICLE CONTROL METHOD THAT COMPARES A LIGHT DISTRIBUTION PATTERN EXTRACTED FROM AN IMAGE CAPTURED BY A CAMERA WITH A REFERENCE LIGHT DISTRIBUTION PATTERN

CROSS-REFERENCE TO RELATED APPLICATION

Pursuant to 35 U.S.C. § 119(a), this application claims the benefit of an earlier filing date and the right of priority to Korean Application No. 10-2017-0046215, filed on Apr. 10, 2017, the contents of which is incorporated by reference herein in its entirety.

TECHNICAL FIELD

The present disclosure relates to a vehicle control method for performing communication with at least one component provided in the vehicle.

BACKGROUND

A vehicle is configured to transport people and objects using kinetic energy. Representative examples of a vehicle include a car and a motorcycle.

In some vehicles, for convenience and safety of users, various types of sensors and electronic devices are implemented to perform different functions of the vehicle.

The functions of such sensors and electronics devices of a vehicle may be classified into a convenience function for a driver's convenience and a safety function for safety of a driver and/or a pedestrian.

Examples of convenience functions typically include an infotainment (e.g., information and entertainment) function, a partial autonomous driving function, or other functions related to a driver's convenience, for examples to improve a driver's visibility at night or at a blind spot. For instance, such a convenience function may include an active cruise control (ACC), a smart parking assist system (SPAS), a night vision (NV), a head up display (HUD), an around view monitor (AVM), or an adaptive headlight system (AHS).

Examples of safety functions include a function to improve a driver's safety and/or pedestrian's safety, and may include as examples a lane departure warning system (LDWS), a lane keeping assist system (LKAS), or an autonomous energy braking (AEB) function.

SUMMARY

Implementations disclosed herein enable systems and techniques for controlling a vehicle to adaptively test and adjust light distribution patterns that are generated by one or more lamps of the vehicle.

In one aspect, a method for controlling a vehicle that includes at least one camera and a lamp is disclosed. The method includes: controlling the at least one camera to capture at least one image of an area in front of the vehicle; extracting, from the at least one image, a light distribution pattern formed by the lamp in the area in front of the vehicle; and performing at least one control related to the extracted light distribution pattern, based on a comparison result obtained by comparing the extracted light distribution pattern with a reference light distribution pattern.

In some implementations, performing the at least one control related to the extracted light distribution pattern comprises: based on a determination that the extracted light distribution pattern does not match the reference light distribution pattern, controlling the lamp to perform a light distribution pattern compensation that transforms the extracted light distribution pattern to the reference light distribution pattern.

In some implementations, controlling the lamp to perform the light distribution pattern compensation comprises: activating or deactivating at least one or more light sources of the lamp to transform the extracted light distribution pattern to the reference light distribution pattern.

In some implementations, controlling the lamp to perform the light distribution pattern compensation comprises: driving at least one or more driving units of the lamp to transform the extracted light distribution pattern to the reference light distribution pattern.

In some implementations, the method further includes: based on a determination that controlling the lamp to perform the light distribution pattern compensation does not satisfy at least one criteria related to executability of the light distribution compensation, controlling the lamp to form a basic light distribution pattern other than the reference light distribution pattern.

In some implementations, the method further includes: based on a determination that controlling the lamp to perform the light distribution pattern compensation does not satisfy the at least one criteria related to executability of the light distribution compensation, restricting execution of a lamp control mode corresponding to the reference light distribution pattern.

In some implementations, the method further includes: based on a determination that controlling the lamp to perform the light distribution pattern compensation does not satisfy the at least one criteria related to executability of the light distribution compensation, outputting notification information to at least one of a mobile terminal or a display provided in the vehicle.

In some implementations, performing the at least one control related to the extracted light distribution pattern further comprises: selecting a reference light distribution pattern among a plurality of reference light distribution patterns; and comparing the selected reference light distribution pattern with the extracted light distribution pattern.

In some implementations, the selected reference light distribution pattern depends on a driving state of the vehicle.

In some implementations, performing the at least one control related to the extracted light distribution pattern is performed according to whether information received from a sensor provided in the vehicle satisfies a predetermined condition related to adjusting the light distribution pattern.

In some implementations, the method further includes controlling the lamp, based on the predetermined condition being satisfied, to operate according to a lamp scenario for consecutively forming different light distribution patterns within a predetermined time. A plurality of light distribution patterns is extracted from a plurality of images captured during the predetermined time, and each of the plurality of light distribution patterns is compared with a different reference light distribution pattern, respectively.

In some implementations, the method further includes: based on the information received from the sensor satisfying a first predetermined condition, operating the lamp according to a first lamp scenario corresponding to the first predetermined condition; and based on the information received from the sensor satisfying a second predetermined condition, operating the lamp according to a second lamp scenario corresponding to the second predetermined condition.

In some implementations, the method further includes: based on an object being detected in front of the vehicle while the lamp is controlled to operate according to a lamp scenario: stopping the control of the lamp to operate according to the lamp scenario; and controlling the lamp to form a basic light distribution pattern.

In some implementations, the method further includes: controlling a display provided in the vehicle to display the at least one image captured by the at least one camera; and controlling the display to display, on the at least one image that is displayed on the display, at least one of a first image corresponding to the extracted light distribution pattern or a second image corresponding to the basic light distribution pattern.

In some implementations, performing the at least one control related to the extracted light distribution pattern is performed based on a determination that a vertical structure is located in front of the vehicle.

In some implementations, the method further includes: determining that a distance between the vertical structure and a first part of the vehicle is a first distance; and generating a control command for the vehicle to move the vehicle so that the distance between the vertical structure and the first part of the vehicle is a second distance that satisfies a predetermined condition. Extracting, from the at least one image, the light distribution pattern formed by the lamp is performed after completion of the movement of the vehicle by the control command.

In some implementations, the method further includes: determining, based on the least one image captured by the at least one camera, a first geographic region in which the comparison result is to be obtained by comparing the extracted light distribution pattern with the reference light distribution pattern; and controlling the lamp to form, on the first geographic region, a test light distribution pattern that is to be utilized in obtaining the comparison result by comparing the extracted light distribution pattern with the reference light distribution pattern.

In some implementations, a type of the test light distribution pattern is varied depending on at least one of a speed of the vehicle or a size of the first geographic region.

In some implementations, controlling the lamp to form, on the first geographic region, the test light distribution pattern further comprises: controlling the lamp to maintain, on a remaining region of the area in front of the vehicle other than the first geographic region, the light distribution pattern that was formed by the lamp in the area in front of the vehicle.

In some implementations, the method further includes: based on a determination that a second vehicle enters into the first geographic region, determining a second geographic region in which the comparison result is to be obtained by comparing the extracted light distribution pattern with the reference light distribution pattern; and controlling the lamp to form the test light distribution pattern on the second geographic region.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that includes one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 1 is a diagram illustrating an example of an appearance of a vehicle according to an implementation of the present disclosure;

FIG. 9 is a diagram illustrating examples of various light distribution patterns formed by a lamp provided in a vehicle;

FIG. 10 is a flow chart illustrating an example of a control method of a vehicle control device according to an implementation of the present disclosure;

FIGS. 23 through 25 are diagrams illustrating examples of performing a malfunction test within a range not to disturb driving of a vehicle;

DETAILED DESCRIPTION

Figure 2:
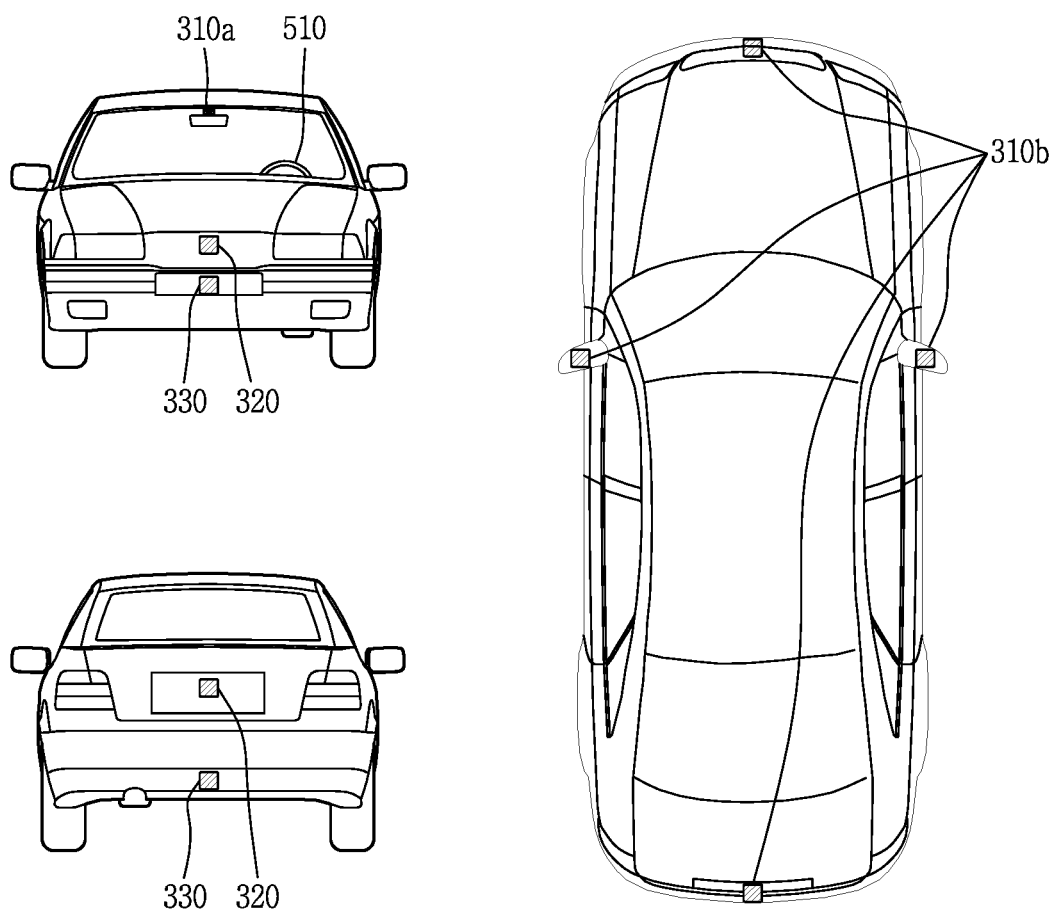
FIG. 2 is a diagram illustrating an example of a vehicle viewed from various angles according to an implementation of the present disclosure.

A lamp is typically provided in a vehicle to provide both convenience functions and safety functions for the vehicle.

In some implementations, the lamp of the vehicle may be adaptively moved, or turned on/off according to the surrounding environment, for example like a human eye. For instance, during high beam operation at night, the lamp may be operated to make a partial region thereof selectively dark so that a driver of another vehicle is not blinded when the other vehicle is positioned in front of the vehicle, while otherwise maintaining the high beam state to make the region bright when the other vehicle passes.

Such types of lamp may be referred to as an intelligence type lamp (or, a smart lamp), and the intelligence type lamp may form various light distribution patterns according to the driving state of the vehicle.

Although an intelligence type lamp is configured to provide safety and convenience when it is normally operated, in some scenarios the lamp may be abnormally operated or may malfunction and cause risk during driving. For instance, although the intelligence type lamp may be configured so as not to radiate light to disturb a driver of another vehicle, in some scenarios the lamp may malfunction or may be abnormally operated to irradiate a strong light to the driver of the other vehicle.

Implementations disclosed herein enable a vehicle control device that may help prevent malfunction of a lamp that is configured to form various light distribution patterns. For example, in some implementations, a vehicle control method determines a malfunction of a vehicle and corrects the determined malfunction.

In some scenarios, implementations disclosed herein may have one or more effects as follows.

According to the present disclosure, a vehicle may perform a malfunction test for a lamp to determine whether the lamp has a malfunction. If a malfunction of the lamp is confirmed, then the malfunction of the lamp may be corrected by a lamp calibration or, alternatively, instead of correcting the malfunction, execution of the light distribution mode may be restricted. Since such malfunction of the lamp may disturb a driver's driving of other vehicle, implementations disclosed herein may proactively reduce the possibility of accident which may occur due to the lamp.

Further, in some implementations, based on a situation in which the malfunction test mode is performed, a reference light distribution pattern suitable to the situation of the malfunction test mode may be selected, and a light distribution pattern corresponding to the selected light distribution pattern may be formed to perform the malfunction test. As such, in scenarios were the vehicle does not constantly test every light distribution pattern, but instead adaptively tests the light distribution pattern depending on the situation, the testing efficiency may be enhanced.

In some implementations, the vehicle according to the present disclosure searches for a position, such as an optimal position, for the malfunction test and performs the malfunction test after executing an autonomous driving to the searched position. Thus, if the malfunction test is performed under the optimum condition, the accuracy of the test can be improved and the user convenience can be increased.

A vehicle according to an implementation of the present disclosure may be any suitable vehicles, such as cars, motorcycles and the like. Hereinafter, the vehicle will be described based on an example of a car.

The vehicle according to the implementation of the present disclosure may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an implementation of the present disclosure.

FIG. 2 is a view illustrating appearance of a vehicle at various angles in accordance with an implementation of the present disclosure.

Figure 3:
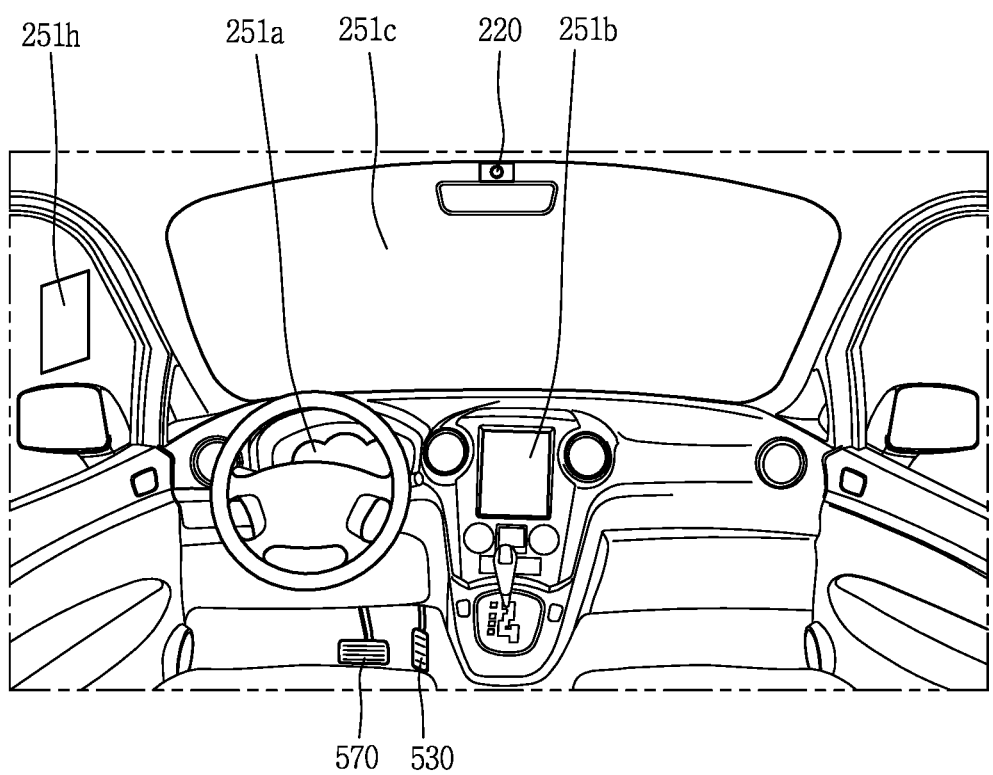
FIGS. 3 and 4 are diagrams illustrating examples of an inside of a vehicle according to an implementation of the present disclosure.
Figure 4:
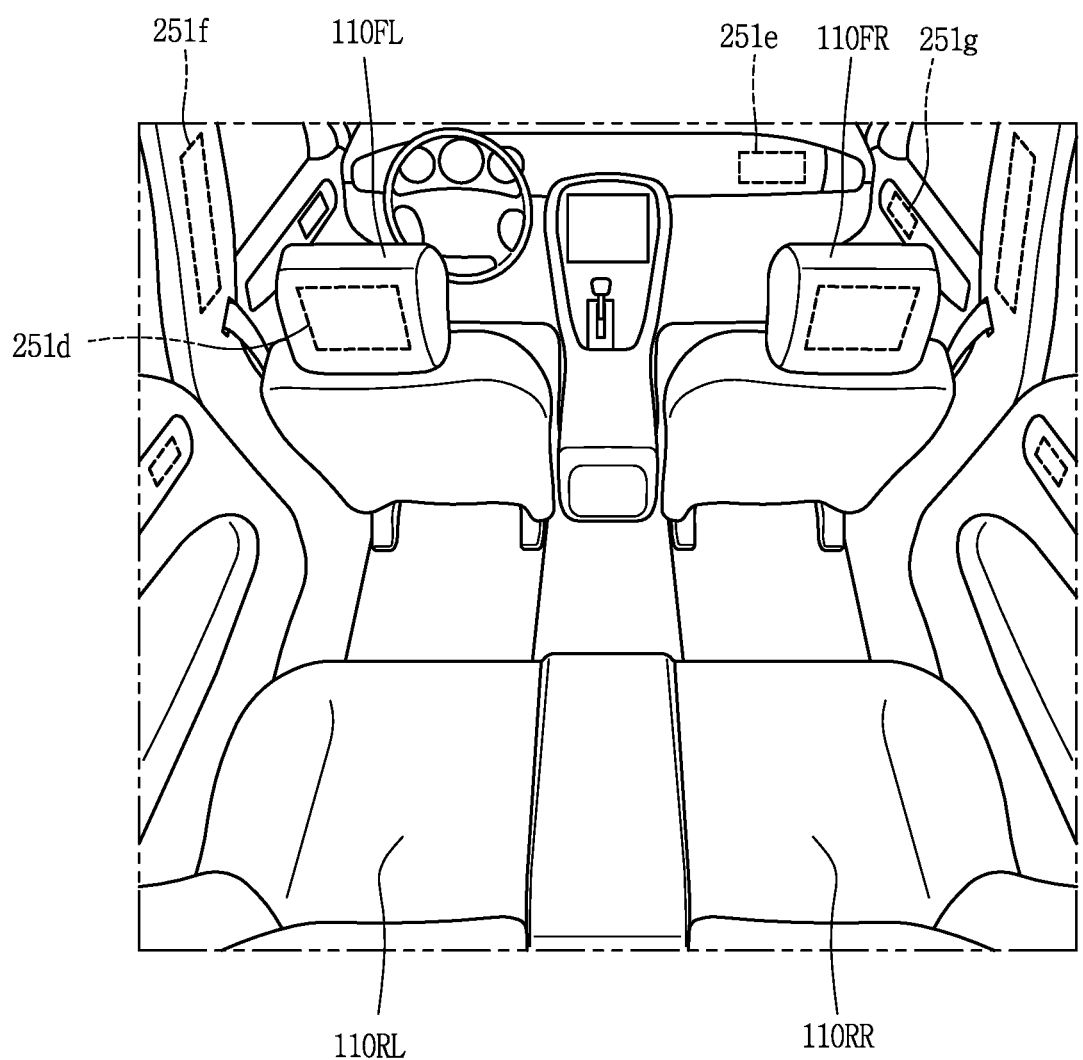

FIGS. 3 and 4 are views illustrating an inside of a vehicle in accordance with an implementation of the present disclosure.

Figure 5:
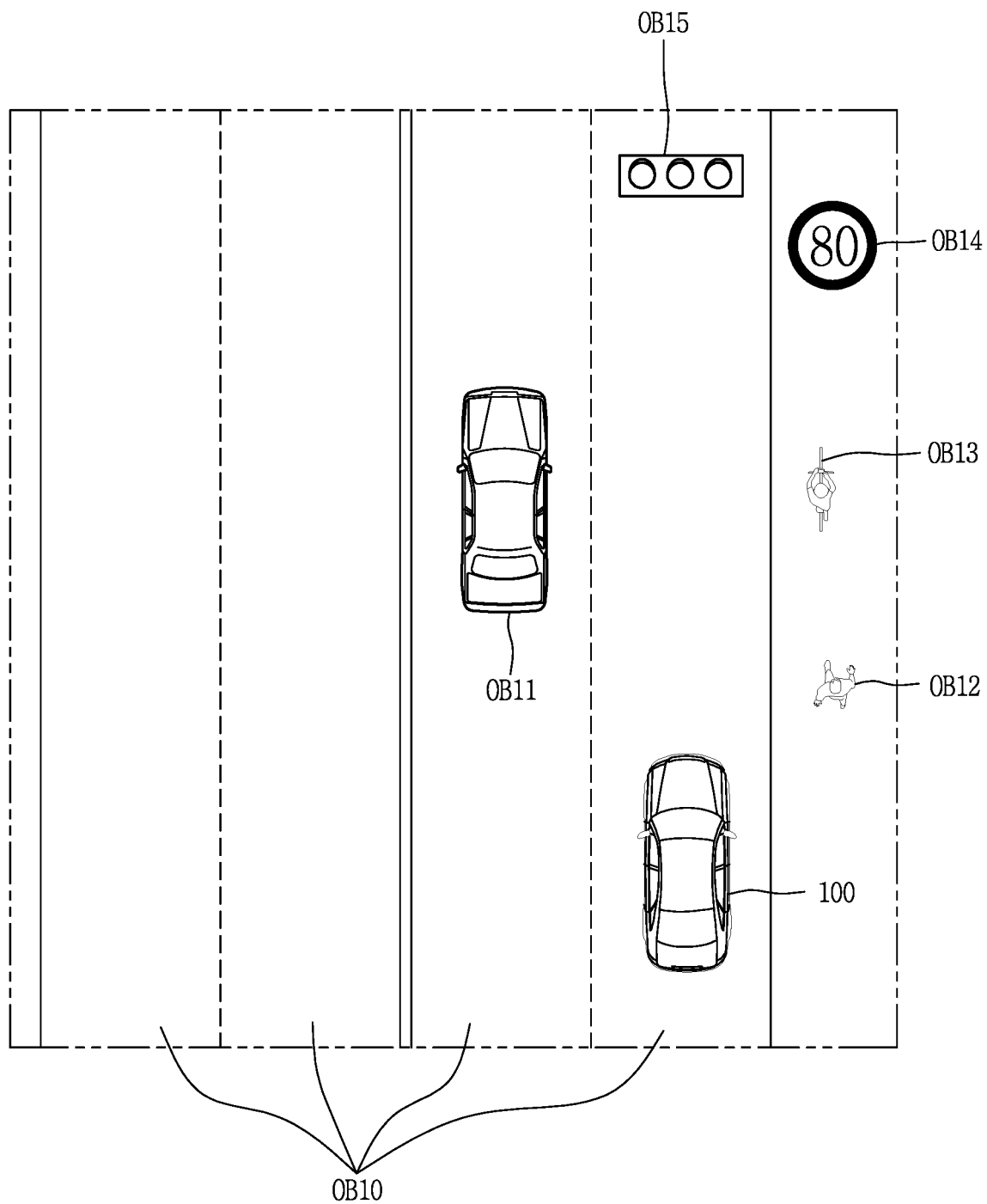
FIGS. 5 and 6 are diagrams illustrating examples of an object detected by a vehicle according to an implementation of the present disclosure.
Figure 6:
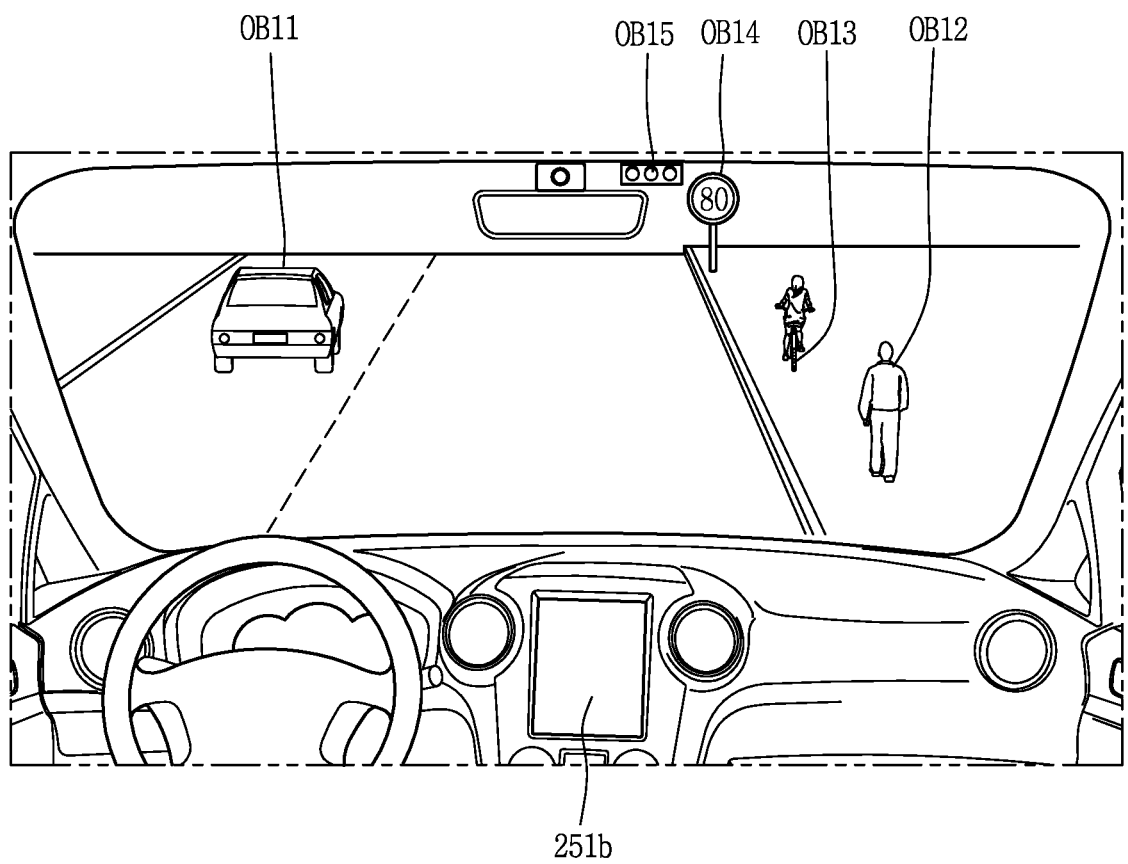

FIGS. 5 and 6 are reference views illustrating objects in accordance with an implementation of the present disclosure.

Figure 7:
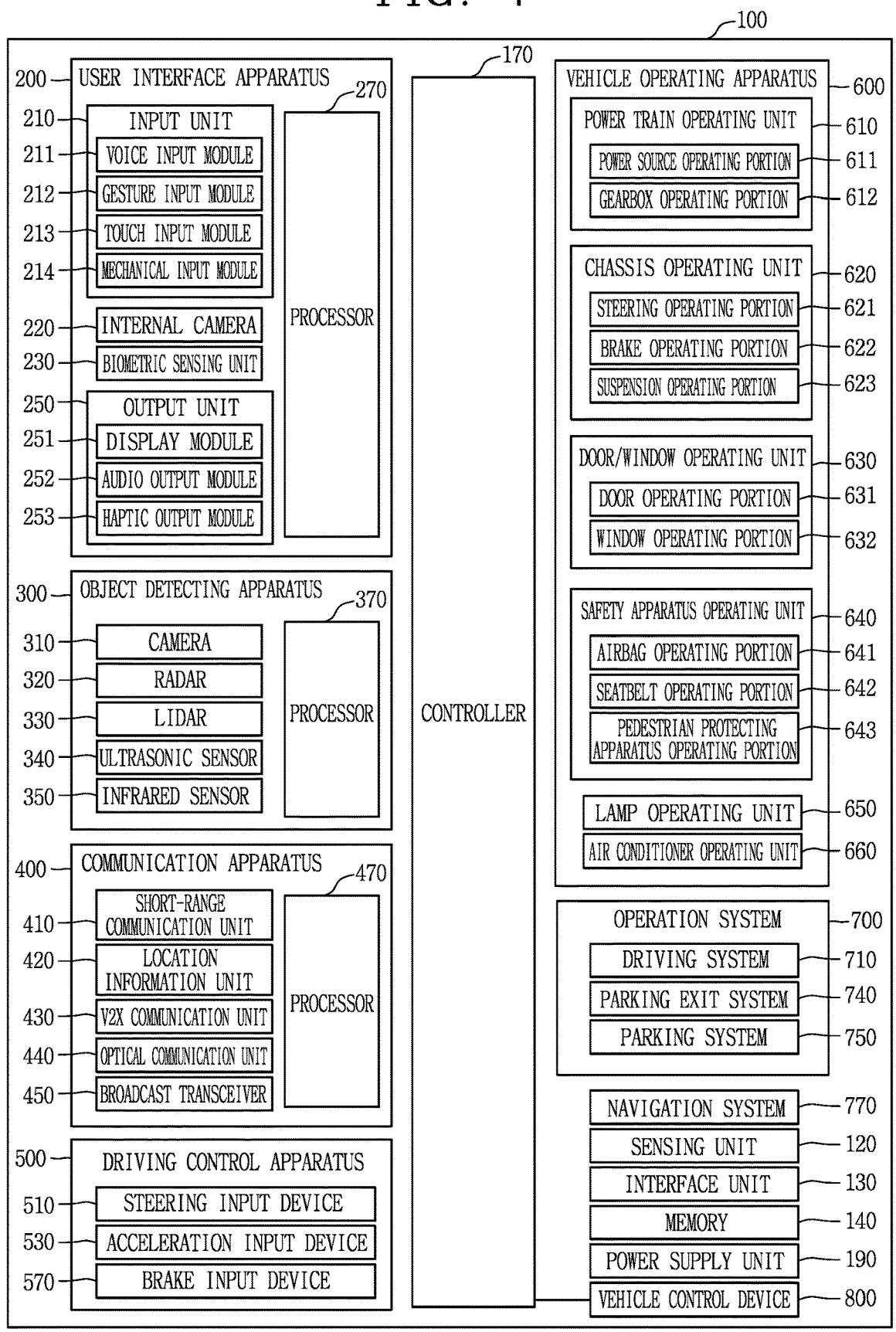
FIG. 7 is a block diagram illustrating an example of a vehicle according to an implementation of the present disclosure.

FIG. 7 is a block diagram illustrating a vehicle in accordance with an implementation of the present disclosure.

As illustrated in FIG. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, at least one processors such as controller 170, and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, at least one camera such as an internal camera 220, a biometric sensing unit 230, an output unit 250, and at least one processor such as processor 270.

According to implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251a through 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of at least one processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may include another vehicle and a pedestrian. The fixed object may include a traffic signal, a road and a structure.

The object detecting apparatus 300 may include at least one camera such as a camera 310, a radar 320, a LiDAR 330, an ultrasonic sensor 340, an infrared sensor 350, and at least one processor such as processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the at least one processor in an individual manner.

When the processor 370 is not included in the object detecting apparatus 300, the object detecting apparatus 300 may operate according to the control of at least one processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and at least one processor such as processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of at least one processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include at least one processor. Each unit of the vehicle operating apparatus 600 may individually include at least one processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100. In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100.

For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air conditioner operating unit 660 may control the air conditioner to supply cold air into the vehicle when internal temperature of the vehicle is high.

The vehicle operating apparatus 600 may include at least one processor. Each unit of the vehicle operating apparatus 600 may individually include at least one processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to implementations, the operation system 700 may further include other components in addition to components to be described, or may not include some of the components to be described.

In some implementations, the operation system 700 may include at least one processor. Each unit of the operation system 700 may individually include at least one processor.

According to implementations, the operation system may be implemented by at least one processor, such as the controller 170, when it is implemented in a software configuration.

According to implementation, the operation system 700 may include at least one of the user interface apparatus 200, the object detecting apparatus 300, the communication apparatus 400, the vehicle operating apparatus 600, or at least one processor, such as the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. For example, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. As such, one or more or all details described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one implementation of the present disclosure, with reference to the accompanying drawings.

In some implementations, the vehicle 100 in accordance with the present disclosure may include the vehicle control device 810.

The vehicle control device 810 may control at least one of the components described in FIG. 7. From this point of view, the vehicle control device 810 may be the controller 170.

The vehicle control device 810 may be an independent separate element from the controller 170. When the vehicle control device 810 is implemented in an independent separate element from the controller 170, the vehicle control device 810 may be one of the electronic equipments disposed in the vehicle 100.

Hereinafter, description will be given for the sake of explanation in that the vehicle control device 810 is an independent separate element from the controller 170. However, the functions (operations) and control methods described with reference to the vehicle control device 810 in the present description may be performed by the controller 170. As such, one or more or all features in association with the vehicle control device 810 may also be identically/similarly applicable to the controller 170.

Further, the vehicle control device 810 described in the present description may include part of various components provided in a vehicle and the components described in FIG. 7. Further, the vehicle control device 810 may transceive information wired/wirelessly with the various components provided in the vehicle, and may perform the vehicle control method as described below, based on the received information. For instance, the vehicle control device 810 may receive information from any component using a CAN (Controller Area Network) and transmit a control command to the component.

Hereinafter, description will be given in detail of the components included in the vehicle control device 810 according to an implementation of the present disclosure.

Figure 8:
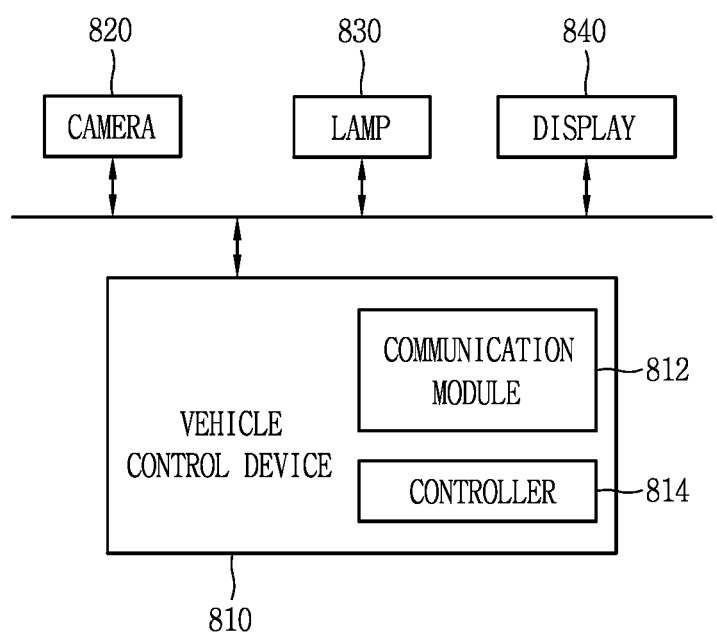
FIG. 8 is a block diagram illustrating an example of a vehicle control device according to an implementation of the present disclosure.

FIG. 8 is a block diagram for explaining the vehicle control device according to an implementation of the present disclosure.

The vehicle control device 810 may include the communication module 812 and at least one processor such as controller 814. And the vehicle control device 810 may communicate with at least one camera such as camera 820, the lamp 830 and the display 840 provided in the vehicle 100.

First, the vehicle control device 810 will be described,

The communication module 812 is configured to communicate with the various components as described in FIG. 7. For instance, the communication module 812 may receive various information provided through the CAN (Controller Area Network). For another instance, the communication module 812 may perform communication with every communicable equipments such as a mobile terminal, a server, other vehicles, and the like. This may be named as V2X (Vehicle to Everything) communication. The V2X may be defined as a technique which exchanges or shares information such as a road situation when driving, while communicating with a road infra and other vehicles.

The controller 814 is configured to control the communication module 810. For example, the controller 814 may generate a control command, based on information received through the communication module 812. The control command may be a message to control one or more components provided in the vehicle 100 to perform a predetermined function.

The controller 814 may receive information related to driving of a vehicle by the various sensors provided in a vehicle through the communication module 812. Also the controller 814 may receive information related to driving of a vehicle, not only by the sensors but by every device provided in the vehicle 100. Hereinafter, all the information received to the vehicle control device is referred to as 'vehicle driving information'.

The vehicle driving information may include vehicle information and surrounding information of a vehicle.

The vehicle information may refer to information regarding the vehicle itself. The vehicle information may include, for instance, a driving speed of a vehicle, a driving direction, an acceleration, an angular velocity, a position (GPS), a weight, the number of boarded persons, a braking power of a vehicle, a maximum braking power of a vehicle, an air pressure of each wheel, a centrifugal force applied to a vehicle, a driving mode of a vehicle (whether it is an autonomous driving mode or a manual driving mode), whether or not a passenger is boarded, and information related to a user.

The surrounding information of a vehicle may refer to information on other objects which are located within a predetermined range from a vehicle and information related to an outside of a vehicle. For instance, the surrounding information of a vehicle may include the condition (a frictional force) of a road surface where a vehicle is running, weather, a distance from a front (rear) vehicle, a relative velocity of a front (rear) vehicle, a curvature of a lane where a vehicle is running when the lane is curved, the ambient brightness around a vehicle, information related to an object located within a reference region (a predetermined region) based on a vehicle, whether or not an object enters/escapes a predetermined region, whether or not a user exists around a vehicle, and information related to a user (for instance, whether a user is authenticated).

Further, the surrounding information (or surrounding environment information) of the vehicle may include an ambient brightness, a temperature, a location of the sun, information on an object located around a vehicle (people, other vehicles, street signs, etc.), types of a road surface where the vehicle is running, landmarks, line information, driving lane information, information required for an autonomous driving mode/an autonomous parking mode/an automatic parking mode/a manual parking mode.

Further, the surrounding information of a vehicle may further include a distance between an object existing around the vehicle 100 and the vehicle 100, the type of the object, the parking space where the vehicle can be parked, and an object to discriminate the parking space (for instance, a parking line, a string, other vehicles, a wall, etc.)

The vehicle driving information is not limited to the examples described above, but may include all information generated by the components provided in the vehicle 100.

In some implementations, the vehicle control device 810 may perform communication with the camera 820, the lamp 830 and the display 840 which are provided in the vehicle 100.

The camera 820 may include one or a plurality of camera modules which are configured to capture outside of the vehicle 100.

When the plurality of camera modules are included, each camera module may capture outside of the vehicle 100 and generate different images. The plurality of images generated by the camera modules may be synthesized into one image. Conclusively, one or more images generated by the camera module 820 may be transmitted to the vehicle control device 810.

The camera 820 may perform capturing in response to a capture command of the vehicle control device 810, or may transmit images captured in response to the capture command to the vehicle control device 810, while performing the capturing.

The lamp 830 may include one or a plurality of optical modules which are disposed in the vehicle 100 and configured to irradiate light toward outside of the vehicle 100. For instance, the lamp 830 may include a headlamp, a tail lamp, a breadth lamp, a fog lamp, a turn indicator, a brake lamp, an emergency lamp, and a backup lamp.

Hereinafter, a description will be given for the sake of explanation of an example in which the lamp 830 is a headlamp which generates a low beam/a high beam, but not limited thereto and may be applicable to various lamps such as a fog lamp, a turn indicator, and the like.

The lamp 830 may form various light distribution patterns.

Here, the light distribution patterns may refer to a pattern which is formed by the light irradiated from the lamp 830 and reaching an object outside of the vehicle 100, and may be defined as a spatial distribution of a lighting generated by a light source. When the lamp 830 forms a light distribution pattern, a border of the light distribution pattern may be defined by connecting spots which have the reference brightness, and the light distribution pattern may be determined by the border.

For instance, the light distribution pattern may be confirmed by the disposition state of the lamp 830 at the vehicle 100, or the images formed on a screen when the lamp 830 irradiates light toward the screen located at a front in a state that the lamp 830 is fixed under the same condition as the disposition of the lamp 830.

As shown in FIG. 9, the lamp 830 may form different light distribution patterns based on the vehicle driving information. For example, at least one light distribution pattern is selected according to the vehicle driving information among the plurality of light distribution patterns, and the lamp 830 is driven so that the selected light distribution pattern is formed. For instance, at least one optical module may be turned on or off according to the selected light distribution pattern. The direction where the turned on optical module faces may be different, and a shield for cutting-off light generated by the optical module may be driven in different methods.

Each light distribution pattern may be referred to as a mode having a predetermined name. For instance, a light distribution pattern formed when it rains more than a reference amount may be called an 'adverse weather mode', and a light distribution pattern formed when driving faster than a reference speed may be called a 'motorway mode'.

For example, when a first light distribution pattern is formed, this may correspond to a first light distribution mode corresponding to the first light distribution pattern being turned on. When the first light distribution pattern is transformed or converted into a second light distribution pattern, this may correspond to the first light distribution mode being turned off and the second light distribution mode corresponding to the second light distribution pattern being turned on. Furthermore, in some implementations, a plurality of light distribution modes may be turned on so that a plurality of light distribution patterns may be formed in an overlapped manner.

In some implementations, each mode may be automatically turned on or off according to whether or not the vehicle driving information satisfies a predetermined condition which is set to each mode, or may be manually turned on or off by a user input.

Further, in some implementations the vehicle may apply, according to various driving conditions, an 'AFLS' (Adaptive Front Lighting System) which automatically controls the angle and brightness of the lamp according to various driving conditions, a 'high beam assist' which automatically converts a high beam and a low beam, and an 'ADB' (Adaptive Driving Beam) which is developed at a higher level, which are described further below.

The adaptive headlamp (AFLS) is a lamp that its lighting angle and brightness are automatically controlled, according to the driving condition. The lighting direction and range of the headlamp are determined by collecting and analyzing various driving data such as a speed of the vehicle, an angle of the steering wheel, and existence and nonexistence of the braking operation. For instance, when a driver turns a steering wheel to the left, the adaptive headlamp irradiates light to the left more than usual, and when a driver turns a steering wheel to the right, the adaptive headlamp irradiates light to the right more than usual.

As a further example, the lamp may be configured to irradiate light in a long distance by reducing a lighting angle and collecting light in order to secure a clear vision at a front long distance on an expressway, and to minimize dazzling to a driver of other vehicle on an opponent side by adjusting a direction of light to prevent occurrence of dazzling of the driver of other vehicle when it rains. When the vehicle is stopped at a crossroads, a wider radiating angle is secured to help a driver apprehend more street information. Also when the vehicle is running at less than 40 Km, light is irradiated wider than a standard radiation angle.

A function to automatically turn on or turn off a high beam is referred to as a high beam assist. The high beam is typically utilized to drive a dark street, but may disturb driving of another vehicle's driver on an opposing side. The high beam assist may be utilized to mitigate such disturbances in such situations. The high beam assist provided in a vehicle may be configured to automatically irradiate a high beam at a dark street, but not to irradiate light to a vehicle located in front of the vehicle. As such, the high beam assist has the function of automatically turning on or off the high beam by recognizing the light of the opposing vehicle.

An adaptive driving beam (ADB) may be referred to as an advanced technology which is configured to automatically convert a high beam and a low beam by detecting a preceding vehicle through a sensor. According to the adaptive driving beam (ADB), a vehicle is driven in a high beam mode ordinarily, but a dark shadow band is generated when a preceding vehicle appears. As a result, a user can perform driving conveniently and does not cause a dazzle to other vehicle's driver.

In some implementations, the display unit 840 may display various types of information under the control of the vehicle control device 810. For instance, the display unit 840 outputs an image received through the camera 820, or information on the light distribution pattern formed by the lamp 830.

Hereinafter, a vehicle control method performed by the vehicle control device 800 will be described in detail. The vehicle control method is a method to control one or more components of the vehicle 100, such as the camera 820 and the lamp 830, and may be performed by the vehicle control device 800 and/or the vehicle 100. The vehicle control method may be produced and distributed in an application type.

Figure 11A:
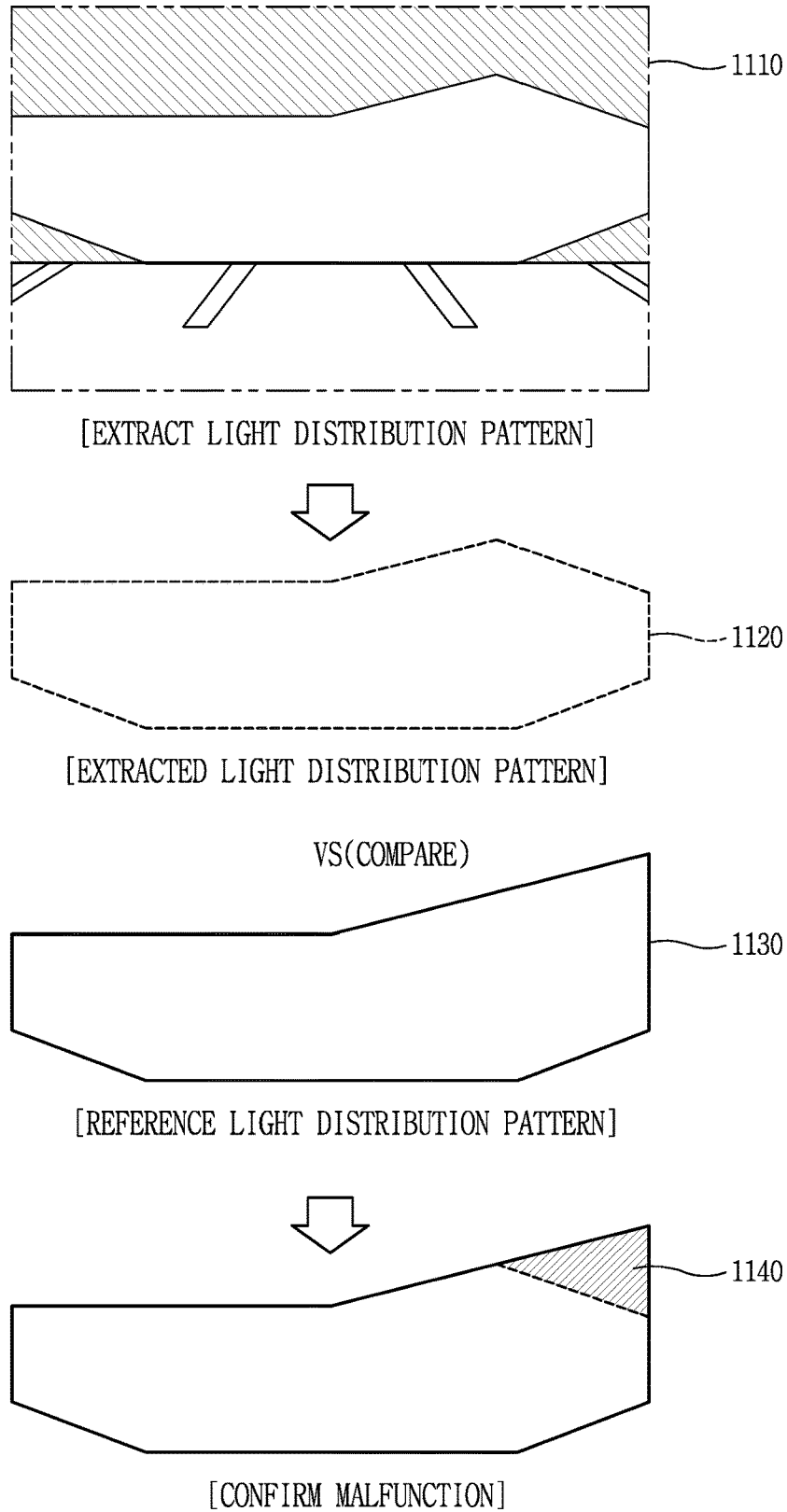
FIGS. 11A and 11B are diagrams illustrating examples of determining malfunction of a lamp.
Figure 11B:
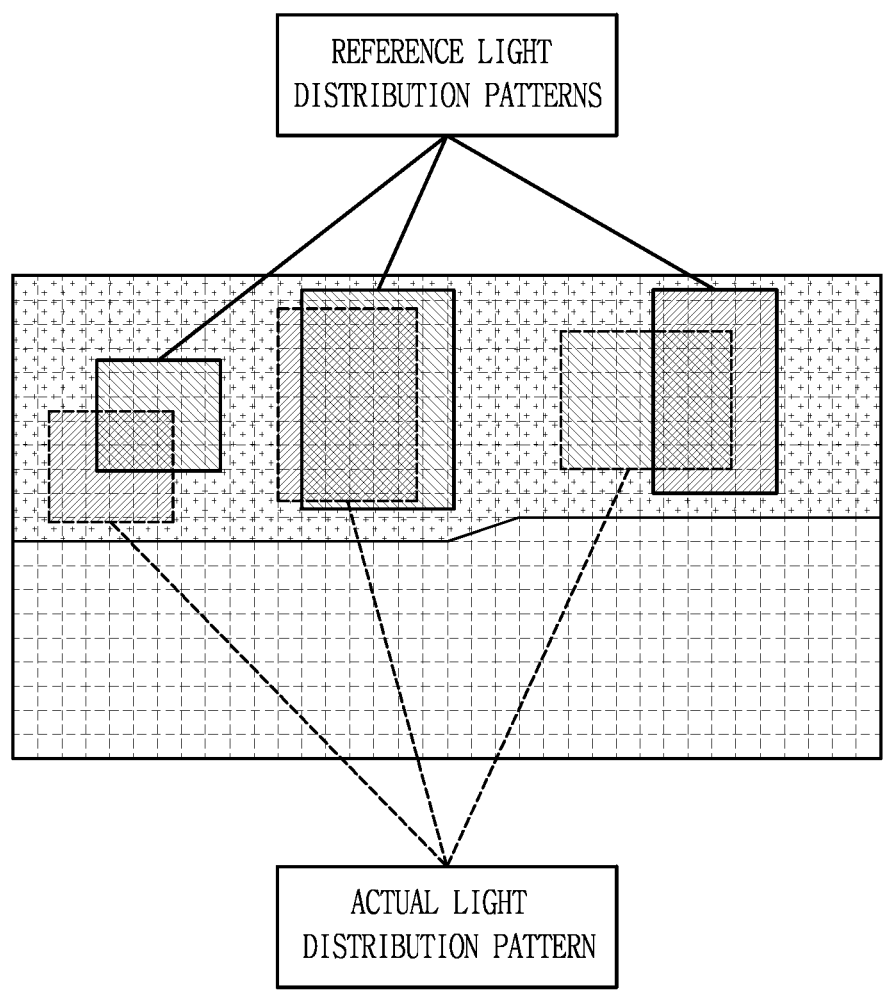

FIG. 10 is a flow chart for explaining an example of a control method of a vehicle control device according to an implementation of the present disclosure, and FIGS. 11A and 11B are diagrams for explaining an example of a method for determining malfunction of a lamp.

First, a malfunction test mode to test malfunction of a lamp is executed (S1010). The malfunction test mode may refer to a motion or a state to control at least one of the camera 820 or the lamp 830 in order to test for a possible malfunction of the lamp 830. When the malfunction test mode is executed, malfunction of the lamp is tested while the at least one of the camera 820 or the lamp 830 is controlled according to a preset method. According to the result of the test, various actions may be implemented, such as compensation of the light distribution patterns is carried out, or output of notification information.

In some implementations, the malfunction test mode is executed only if a test condition which is set for the malfunction test mode is satisfied. In such implementations, if the test condition is not satisfied, the malfunction test mode is not executed.

For example, the vehicle control device 800 may receive vehicle driving information related to a vehicle driving operation from various electronic components provided in the vehicle 100. The electronic components may include, for example, a steering angle sensor, a velocity sensor, a vehicle height sensor, an accelerometer, a radar, a temperature sensor, and the like. The vehicle driving information may include various types of information transmitted to the vehicle control device 800.

In some implementations, the vehicle control device 800 determines whether the condition of the vehicle 100 satisfies the test condition, based on the vehicle driving information. The malfunction test mode may be selectively executed according to whether or not the information received from the sensors of the vehicle satisfies the test condition which is set for compensation of the light distribution patterns.

The vehicle control device 800 determines whether or not the information received from the sensors provided in the vehicle satisfies the test condition which is set for compensation of the light distribution patterns. If the test condition is satisfied, at least one of the steps (S1030-1090), which will be described later, is performed. Conversely, if the predetermined condition is not satisfied, at least one of the steps is not performed. In such implementations, the compensation of the light distribution pattern is performed only in a case where the predetermined condition is satisfied.

If the test condition is satisfied, a control according to the malfunction test mode is executed, and execution of the malfunction test mode may be deferred if the test condition is not satisfied. When execution of the malfunction test mode is deferred, the malfunction test mode is not performed until the test condition is satisfied, but executed when the test condition is satisfied.

In some implementations, if the test mode is not satisfied, then the vehicle control device 800 may start an autonomous driving of the vehicle 100 so that the test condition is satisfied. For example, the vehicle control device 800 may determine a location or position where the test condition is satisfied, and generate a movement command to move the vehicle 100 to the determined position or location. The vehicle 100 starts an autonomous driving in response to the movement command, and when the vehicle 100 is parked at the determined position or location, the malfunction test mode is executed.

As used in this disclosure, autonomous driving refers to a driving mode in which at least one of a speed control or a direction control is performed by an algorithm of software.

In some implementations, the test condition may include an environment condition for performing a malfunction test and a start condition for starting a malfunction test.

In implementations were the malfunction test is performed by images captured by the camera 820, the environment condition is related to a state that the light distribution pattern can be extracted from the images. For instance, the environment condition may be set by minimum environment factors required for performing the malfunction test, such as when the outside of the vehicle 100 is darker than a criterion, when a space for performing the malfunction test is secured, when a pedestrian or other vehicle does not exist in the space, and when the vehicle is parked or travelling at a predetermined speed.

The start condition is related to time or situation to start the malfunction test. For instance, various test conditions may be preset, such as in a case where the vehicle is started, in a case where a screen configured to perform the malfunction test is located in front of the vehicle, in a case where an autonomous driving is started, in a case where an autonomous driving is performed, and in a case where the vehicle is travelling within a predetermined speed range. When at least one of the test conditions is satisfied, the malfunction test mode may be automatically performed, even without a user's request. As another example, when a user requests execution of the malfunction test mode, the malfunction test mode may be executed.

In such implementations, if the environment conditions and the start conditions are sufficiently satisfied, then the malfunction test mode may be executed. If the start condition is converted from a satisfaction state into a dissatisfaction state while the malfunction test mode is executed, then the malfunction test mode may be stopped or terminated.

The test conditions for executing the malfunction test mode are not limited to the above examples, and may include other suitable criteria according to various implementations.

In some implementations, when the malfunction test mode is executed, the vehicle control device 800 controls the camera 820 provided in the vehicle 100 to capture images (S1030).

The operation of capturing images may be configured to extract or determine the light distribution pattern formed by the lamp 830. As such, when the camera 820 is provided with a plurality of camera modules, at least one camera module, which is configured to extract the light distribution pattern, may selectively capture images.

For instance, when malfunction is tested to a left headlamp in a state that a left camera corresponding to a left front headlamp and a right camera corresponding to a right front headlamp are provided, images may be captured using the left front camera module. Alternatively, when malfunction of the left and right headlamps is tested, images may be captured using the left and right front camera modules.

The vehicle control device 810 may control the lamp 830 so that the light distribution patterns may be included in the images.

Next, the light distribution patterns are extracted from the captured images (S1050). In some implementations, the light distribution patterns may be extracted by performing an image processing to the captured images.

For instance, a border of the light distribution pattern may be extracted by consecutively connecting spots having a predetermined brightness from the captured images, and the light distribution pattern may be extracted, using the border. In another instance, the border of the light distribution pattern may be extracted by extracting pixels that a brightness difference between neighboring pixels is larger than a criterion and connecting the extracted pixels. The light distribution pattern may be extracted through other various image processing methods.

Next, the extracted light distribution pattern and a reference light distribution pattern are compared with each other (S1070).

Comparison may be performed using any suitable criteria, such as the shape, the position, and/or the brightness of the reference light distribution pattern and the extracted light distribution pattern.

According to which light distribution mode is executed, the light distribution pattern which is formed in front of the vehicle 100 may be varied. For instance, when a first light distribution mode is executed, a first light distribution pattern corresponding to the first light distribution mode is formed, and when a second light distribution mode is performed, a second light distribution pattern corresponding to the second light distribution mode is formed.

The malfunction test mode tests whether the light distribution pattern of the light distribution mode which is being executed is correctly formed. For example, when the first light distribution mode is executed, the first light distribution pattern of the first light distribution mode is a reference light distribution pattern, and the extracted light distribution pattern is compared with the first light distribution pattern.

Moreover, the malfunction test mode may select at least one light distribution mode based on the vehicle driving information, and test whether the selected light distribution mode is correctly operated. For instance, the second and third light distribution modes may be selected while the first light distribution mode is performed. The first through third light distribution modes are consecutively performed, and as a result, the first through third light distribution patterns may be consecutively formed. Three different light distribution patterns are extracted, and each of the extracted light distribution patterns may be compared with a different reference pattern.

As shown in the example of FIG. 11A, when a vertical structure is located in front of the vehicle 100, a light distribution pattern may be formed on the structure. The images 1110 captured by the camera 820 may include the structure and the light distribution pattern formed on the structure as well. The light distribution pattern 1120 extracted from the image 1110 is compared with a reference light distribution pattern 1130, and malfunction of the lamp 830 is confirmed based on a discordant region 1140.

As shown in the example of FIG. 11B, the images captured by the camera 820 may be latticed by a plurality of grids. Since each grid has a predetermined coordinates value, the vehicle control device 810 may confirm malfunction of the lamp 830 by comparing the coordinates value of the reference light distribution pattern and the coordinates value of the extracted light distribution pattern.

In some implementations, the vehicle 100 may further include an image output unit which is configured to output images to outside of the vehicle 100. The image output unit may output images to a virtual region formed at the outside of the vehicle 100, like a beam projector.

For instance, when the malfunction mode is executed, the image output unit may output a coordinates image for testing the malfunction mode. For instance, the vehicle control device 810 may easily calculate a coordinates scope of the light distribution pattern, using the coordinates image which is overlapped with the light distribution pattern.

For another instance, the image output unit may output a reference light distribution pattern for testing the malfunction mode. In this instance, the image includes both the light distribution pattern formed by the lamp 830 and the reference light distribution pattern formed by the image output unit, and the vehicle control device 810 may compare the light distribution pattern included in the image with the reference light distribution pattern.

Based on the comparison result, at least one control related to the extracted light distribution pattern may be executed (S1090).

When the extracted light distribution pattern does not match with the reference light distribution pattern, the lamp 830 may be controlled so that compensation for transforming or converting the extracted light distribution pattern into the reference light distribution pattern may be performed. For example, a control for matching the extracted light distribution pattern with the reference light distribution pattern may be performed.

Such an operation that performs light distribution pattern compensation may be referred to as a lamp calibration. For example, a process for satisfying a criterion by controlling the shape, position, size, and/or color temperature of the light distribution pattern, considering the features and properties of the lamp, may be defined as the lamp calibration.

An example of lamp calibration will be described with reference to FIG. 12.

Figure 12:
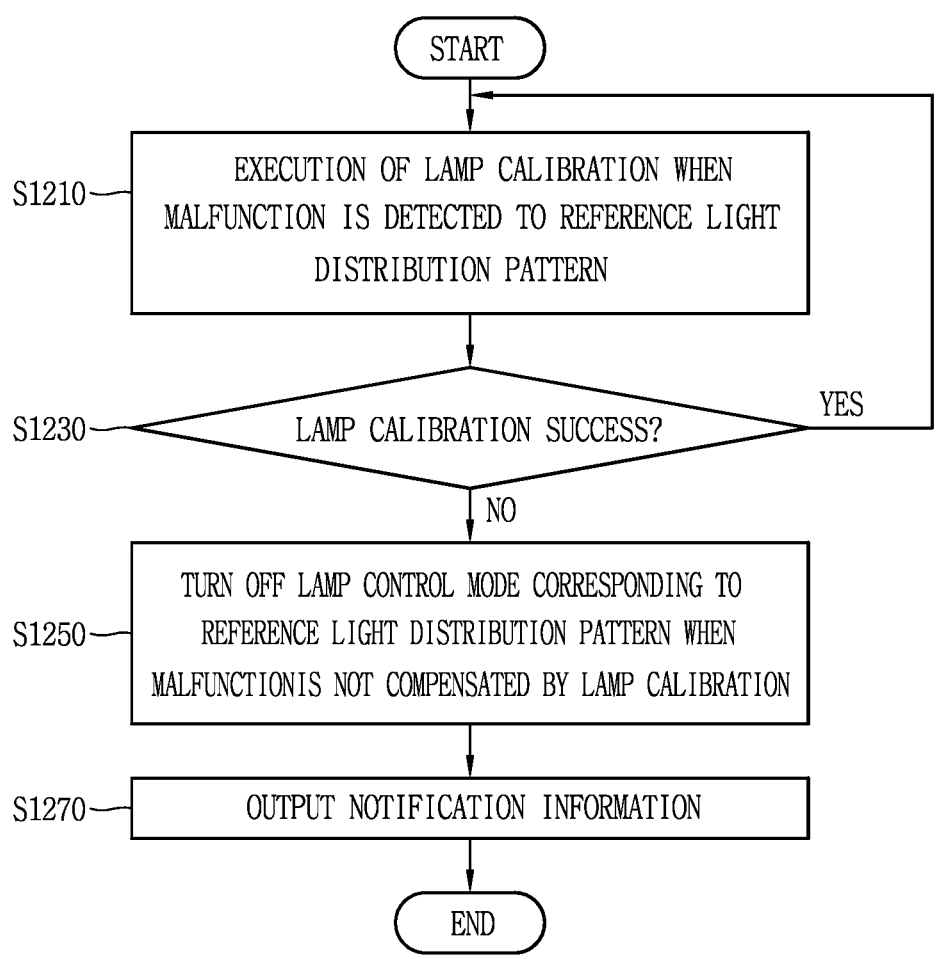
FIG. 12 is a flowchart illustrating an example of a vehicle control method in a scenario in which malfunction of a lamp is confirmed.

FIG. 12 is a flowchart for explaining a vehicle control method when malfunction of a lamp is confirmed.

When a malfunction with respect to a reference light distribution pattern is detected, a lamp calibration is executed (S1210). The lamp calibration may be performed by at least one of a hardware method or a software method.

When the lamp 830 includes one or more light sources, at least one light source may be turned on or off so that the light distribution pattern compensation may be carried out.

For instance, as shown in FIG. 11B, the extracted light distribution pattern may include a first part which is matched with the reference light distribution pattern and a second part which is not matched with the reference light distribution pattern. The reference light distribution pattern may include a third part which is not matched with the second part and the extracted light distribution pattern.

The light source corresponding to the second part may be kept in a turn-on state, the light source corresponding to the first part may be converted from a turn-on state into a turn-off state, and the light source corresponding to the third part may be converted from a turn-off state into a turn-on state. As a result, the extracted light distribution pattern may be compensated into the reference light distribution pattern.

When the lamp 830 includes a driving unit which is configured to move the direction of light, the driving unit may be operated to perform the compensation of the light distribution pattern. For instance, when the shape of the reference light distribution pattern is matched with that of the extracted light distribution pattern, but the positions thereof are not matched, the driving unit may be driven to move the extracted light distribution pattern to a position where the reference light distribution pattern is displayed.

After the lamp calibration is performed, whether or not the lamp calibration is successful is determined (S1230).

For example, in some implementations, an image is recaptured by controlling the camera 820, and a light distribution pattern is extracted again. If the re-extracted light distribution pattern is determined to match the reference light distribution pattern, the lamp calibration is determined to be successful, and the malfunction test mode may be terminated.

On the other hand, if the re-extracted light distribution pattern is not matched with the reference light distribution pattern, it may be determined that the lamp calibration is unsuccessful. The matching may be determined according to various types of criteria, for example based on an amount of similarity.

In some implementations, if the malfunction is not compensated by the lamp calibration, the lamp control mode corresponding to the reference light distribution pattern is turned off (S1250). For example, if the lamp control mode corresponding to the reference light distribution pattern is in a malfunction state which is not possible to be compensated, execution of the lamp control mode is restricted so that a light distribution pattern corresponding to the reference light distribution pattern is not formed.

In some implementations, if the operation of compensation of the light distribution pattern is not executable, the lamp 830 is controlled to form a basic light distribution pattern, rather than the reference light distribution pattern.

For instance, a malfunction test mode may be executed to test a reference light distribution pattern corresponding to an adverse weather mode during execution of the adverse weather mode. If the reference light distribution pattern corresponding to the adverse weather mode is in a malfunction state which is not correctable, then execution of the adverse weather mode is restricted. For example, the lamp 830 may be configured to form a basic light distribution pattern instead of the reference light distribution pattern corresponding to the adverse weather mode. In some implementations, for example to prevent a third party from being adversely affected due to the adverse weather mode of the vehicle, the adverse weather mode is turned off until the lamp 830 is repaired or functions correctly. Thereafter, the adverse weather mode is not executed even though the execution condition of the adverse weather mode is satisfied, and the lamp 830 instead forms a basic light distribution pattern.

As an example, the basic light distribution pattern may be a low beam having a cutoff line which is basically generated by the lamp 830. However, the basic light distribution pattern may be any suitable light distribution pattern according to various implementations.

In some implementations, if compensation of the light distribution pattern is not executable, then the vehicle control device 810 may output notification information (S1270). The notification information may be outputted to at least one of a preset mobile terminal or the display unit 840 provided in the vehicle 100. The notification information is the information that compensation of light distribution pattern is not executable, and may refer to information informing that execution of a specific light distribution mode is restricted. For instance, when execution of the adverse weather mode is restricted, notification information informing to a passenger that the adverse weather mode is not executed may be outputted.

The notification information may include a handling manual which may be referred to by a user so that compensation of the light distribution pattern may be performed. For instance, the handling manual may include the types and positions of parts to be substituted, and a substitution method. A user can repair the lamp 830 seeing the handling manual.

Moreover, the notification information may include road guide information recommending a car repair shop which can repair the lamp 830 as a new destination. The new destination may be searched based on at least one of a position of the vehicle 100 and a destination of the vehicle 100. For instance, a car repair shop located within a predetermined distance from the vehicle 100 may be searched, or a car repair shop located on a route toward the destination of the vehicle 100 may be searched.

According to the present disclosure, the vehicle executes a malfunction test mode with respect to the lamp 830, and can correct malfunction of the lamp 830 by the lamp calibration when malfunction is checked. The malfunction of the vehicle may be a factor to disturb driving of other vehicles' drivers, but the vehicle compensates for the malfunction by itself, or restricts execution of a light distribution mode which cannot be compensated for, so that it is possible to prevent in advance the possibility of generating an accident which may occur due to the lamp.

In some implementations, the reference light distribution pattern which may be a reference of comparison in the malfunction test mode may be variously selected.

Figure 13:
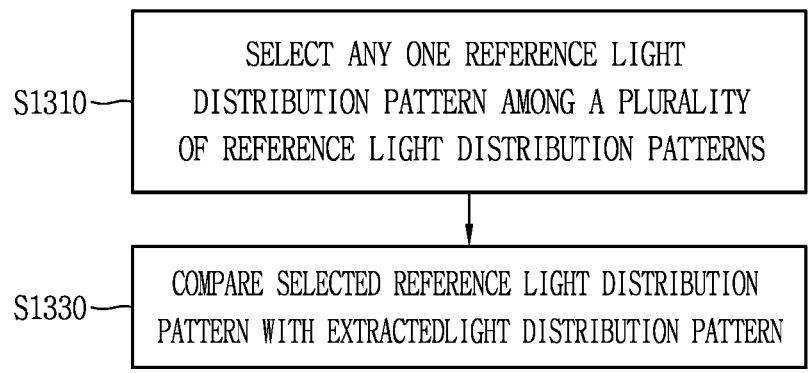
FIG. 13 is a flowchart illustrating an example of a vehicle control method for selecting a reference light distribution pattern according to a driving condition.

FIG. 13 is a flowchart for explaining a vehicle control method for selecting a reference light distribution pattern according to a driving condition.

The vehicle control device 810 extracts a light distribution pattern from images captured by the camera 820, and compares the extracted light distribution pattern with the reference light distribution pattern. In this instance, the reference light distribution pattern to be compared may be selected from any one of a plurality of reference light distribution patterns which is stored in memory. For example, when the malfunction test mode is executed, the vehicle control device 810 may select any one of a plurality of reference light distribution patterns (S1310).

The reference light distribution pattern for executing the malfunction test is selected according to various conditions at the time the malfunction test mode is executed, and the lamp 830 is controlled to test the selected reference light distribution pattern.

For instance, when the malfunction test mode is executed while the lamp 830 forms a first light distribution pattern according to the first light distribution mode, the first light distribution pattern is selected. As such, the light distribution pattern which is currently formed by the lamp 830 may be tested.

On the other hand, irrespective of whether the lamp 830 forms any light distribution pattern, a specific light distribution pattern is formed under a specific situation, and the specific light distribution pattern may be tested. When the lamp 830 is turned off when the malfunction test mode is executed, the lamp 830 may be turned on and controlled to form the specific light distribution pattern.

For instance, when a vehicle is parked facing a vertical structure, the vehicle control device 800 may select at least one light distribution pattern among the plurality of reference light distribution patterns, which can be tested based on a distance from the structure. When the second light distribution pattern and the third light distribution pattern are selected based on the distance, the lamp 830 may form the second and third light distribution patterns simultaneously, or in a consecutive order at different times so as not to be overlapped with each other. And occurrence of a malfunction may be tested by comparing the light distribution pattern extracted from the image with the second and third light distribution patterns.

The reference light distribution pattern may be changed according to the driving state of the vehicle 100. The type of the selected reference light distribution pattern may be changed according to whether the vehicle 100 is travelling or parked, the speed of the vehicle 100 when the vehicle 100 is travelling, the distance between the vehicle 100 and an object located in front of the vehicle 100 when the vehicle 100 is parked, and the weather.

Moreover, the selected reference light distribution pattern may be changed according to an object located in front of the vehicle 100. The types of the selected reference light distribution pattern may be changed according to a case where a sigh is located in front of the vehicle 100, other vehicle is located, a reflection board or a reflecting mirror is located, or a vertical structure is located.

Next, the vehicle control device 810 compares the selected reference light distribution pattern with the extracted light distribution pattern (S1330). According to the comparison result, at least one control related to the extracted light distribution pattern may be selectively performed.

At least one reference light distribution pattern is selected so as to be in conformity with the time and situation that the malfunction test mode is executed, and a light distribution pattern corresponding to the selected reference light distribution pattern is formed so that the malfunction test mode is performed. All the light distribution patterns are not always tested, but the light distribution pattern to be tested is varied depending on the time and situation so that the test efficiency can be improved.

In some implementations, when the malfunction test mode is executed, the lamp is operated according to a lamp scenario and the malfunction test may be performed with respect to the lamp scenario.

Figure 14:
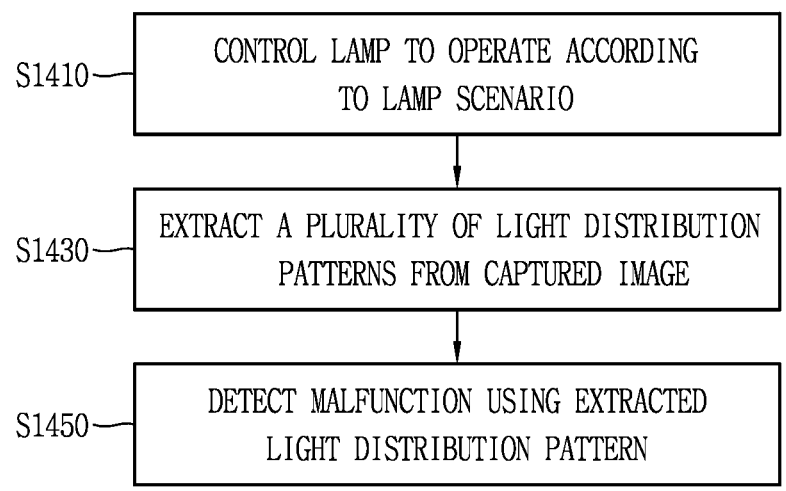
FIG. 14 is a flowchart illustrating an example of a vehicle control method to perform a malfunction test according to a scenario.

FIG. 14 is a flowchart for explaining a vehicle control method to perform a malfunction test according to a scenario.

When the start condition is satisfied, the vehicle control device 810 may execute a malfunction test mode. In this instance, the lamp 830 may be controlled so as to be operated according to a lamp scenario that is set to form different light distribution patterns in a consecutive order within a predetermined time (S1410).

While the lamp 830 is operated according to the lamp scenario, images are captured, and a plurality of light distribution patterns are extracted from the captured images (S1430).

Next, a malfunction is detected using the extracted light distribution pattern (S1450). For example, a plurality of light distribution patterns is extracted from the images captured within the predetermined time, and each of the plurality of light distribution patterns is compared with the different reference light distribution pattern.

It is possible to confirm the malfunction with respect to at least one of the extracted light distribution patterns by comparing the extracted light distribution patterns with the reference light distribution patterns corresponding thereto. For instance, when the first and second light distribution patterns are consecutively formed, the first light distribution pattern may be compared with the first reference light distribution pattern and the second light distribution pattern may be compared with the second reference light distribution pattern.

In some implementations, when information received from the sensor provided in the vehicle 100 satisfies a first test condition, the lamp 830 may be operated by a first lamp scenario corresponding to the second test condition. On the contrary, when information received from the sensor provided in the vehicle 100 satisfies a second test condition, the lamp 830 may be operated by a second lamp scenario corresponding to the second test condition.

For instance, when the vehicle 100 is parked, the lamp 830 may be operated by a 'parking lamp scenario' which is suitable to test in the parking state, and when the vehicle 10 is travelling, the lamp 830 may be operated by a 'driving lamp scenario' which is suitable to test in a driving state.

The types and numbers of the light distribution pattern formed by the lamp 830 and the order of formation of the light distribution pattern may be varied according to the selected scenario. Further, the predetermined time that the scenario is executed may be varied according to the selected scenario.

In some implementations, as the lamp 830 is operated by the lamp scenario, an unintentional dazzle may occur to a third party due to the light irradiated from the lamp 830. To prevent such an unintentional damage to a third party, the vehicle control device 810 may terminate the control of the lamp 830 according to a lamp scenario, when an object is detected in front of the vehicle 100 during controlling the lamp by the lamp scenario.

As the control of the lamp 830 is terminated, the lamp 830 may be turned off or form a basic light distribution pattern, thereby preventing such a situation that light is unintentionally irradiated to a third party.

Hereinafter, a specific description will be given of a method to execute a malfunction test mode by the vehicle control device according to a test condition. Each implementation will be described by dividing the situations that malfunction test mode can be executed mainly into a parking state, a starting state and a driving state.

FIGS. 15A, 15B, 16 and 17 are views for explaining a vehicle control method for performing a malfunction test when a vertical structure is located in front of a vehicle.

The vehicle control device 810 may determine whether or not the vehicle 100 enters a parking place, whether or not a parking is being executed, and whether or not a parking is completed, based on various information such as a destination set by a user, the position, speed, gear and operation of the side brake of the vehicle 100, and images received from the camera.

From the time the vehicle 100 enters a parking place to the time the parking is completed is defined as a 'parked state'. The parking place may refer to a place where the vehicle 100 will be parked or an area within a predetermined distance from a parked place.

When the vehicle 100 is in a parked state, it is determined whether or not the situation around the vehicle 100 satisfies a preset environment condition. Also, it is determined whether a minimum illumination that a malfunction test mode can be executed is satisfied, or a virtual screen region that a light distribution pattern can be tested is secured, using various sensors provided in the vehicle 100.

When the environment condition is not satisfied, the malfunction test mode is not executed. On the contrary, when the environment condition is satisfied, the vehicle control device 810 may execute the malfunction test mode in the parked state. For example, the vehicle control device 810 may detect a structure stood in one direction around the vehicle 100, and perform the malfunction test mode using the light distribution patterns formed on the structure.

Figure 15A:
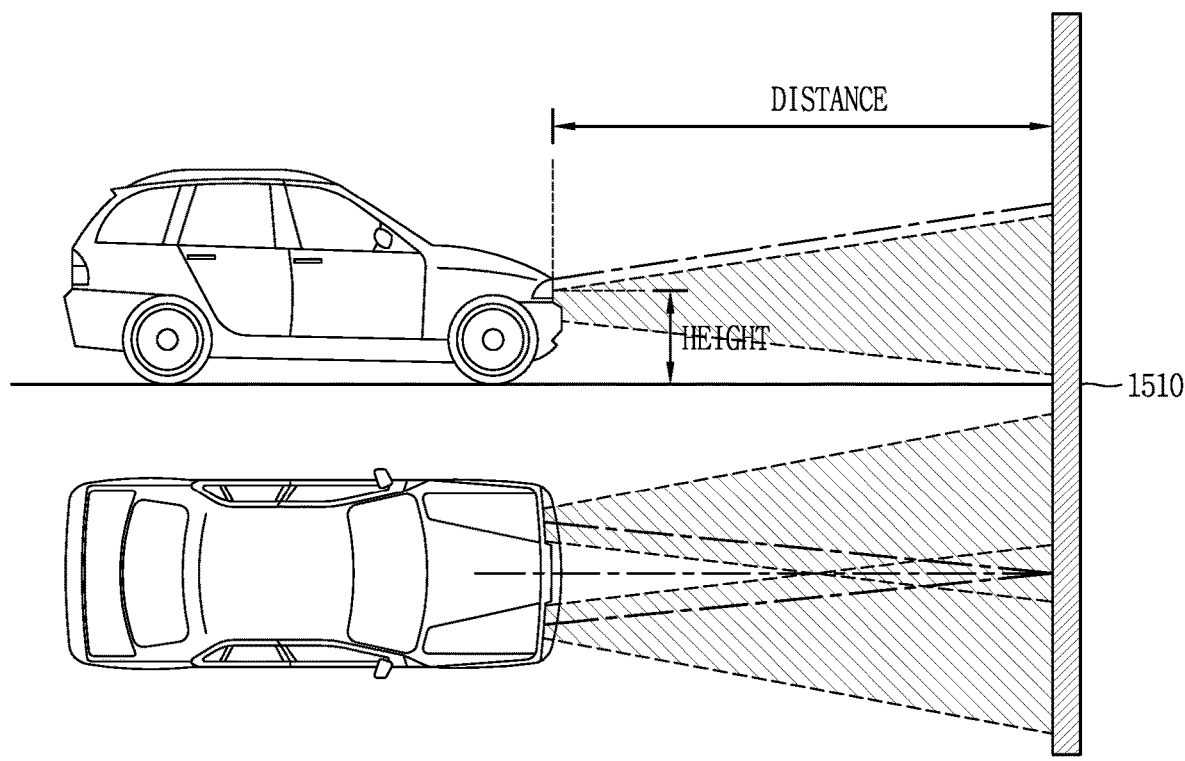
FIGS. 15A, 15B, 16, and 17 are diagrams illustrating examples of performing a malfunction test when a vertical structure is located in front of a vehicle.

As shown in FIG. 15A, when a wall 1510 exists in front of the vehicle 100, light outputted from the lamp 830 forms a light distribution pattern on the wall 1510. The vehicle control device 100 executes a malfunction test, based on the distance between one point of the vehicle 100 and one point of the wall 1510, and the height between one point of the vehicle 100 and one point of the bottom. The reference light distribution pattern which is an object to be compared may be varied according to at least one of the distance and the height.

The vehicle control device 810 may execute a left lamp scenario using a left headlamp, a right lamp scenario using a right headlamp, and left and right lamp scenarios using the left and right scenarios. Since the right headlamp is turned off while the left lamp scenario is executed, it is possible to more accurately test the left headlamp.

Figure 15B:
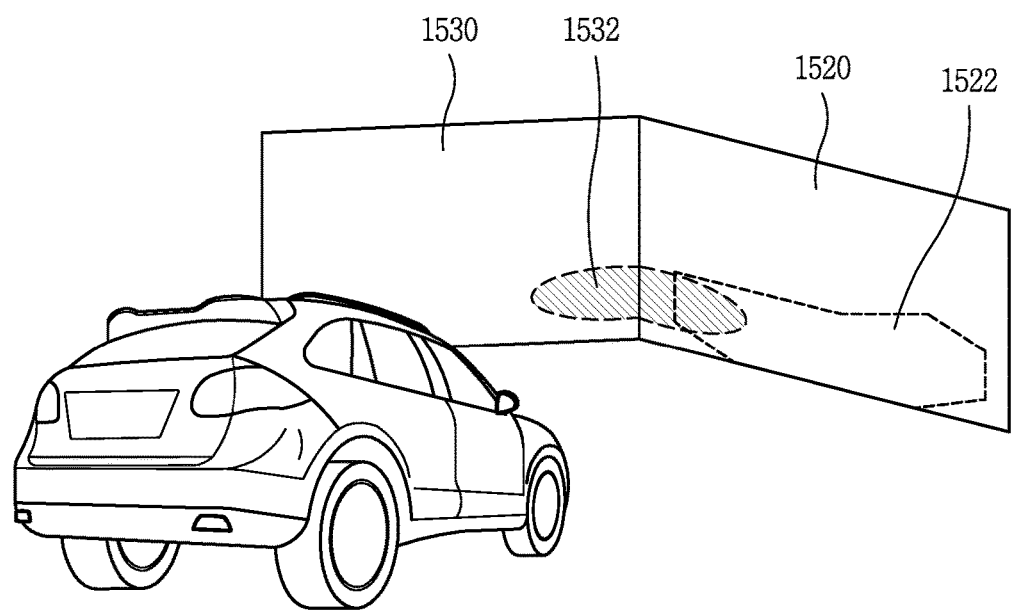
Figure 16:
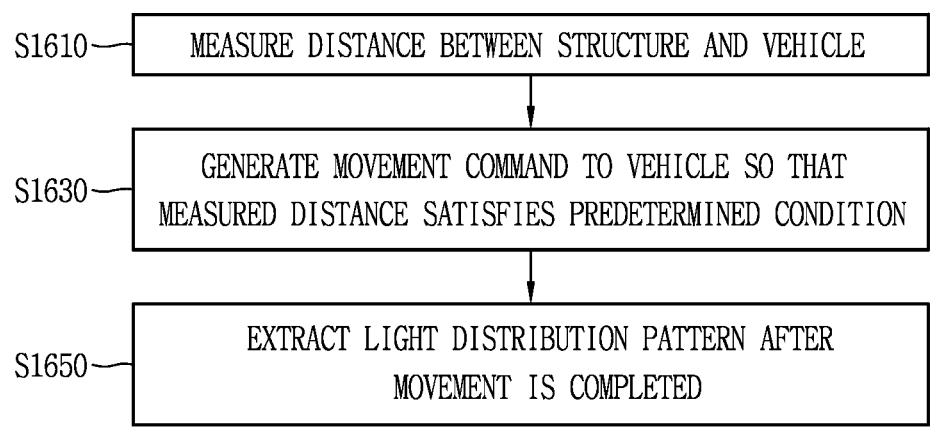

As shown in FIG. 15B, when a structure surrounding the vehicle 100 exists around the vehicle 100, various light distribution patterns may be tested using the structure. For instance, the test of the left lamp scenario 1522 may be executed using a first structure 1520 located in front of the vehicle 100, and the left lamp scenario 1532 may be executed using a second structure 1530 located at the left side of the vehicle 100.

In some implementations, the position of the vehicle 100 may be improper to execute the malfunction test mode. To execute an efficient malfunction test mode, the vehicle 100 may perform an autonomous driving.

For example, the vehicle control device 810 measures the distance between the vehicle 100 and the structure (S1610). The distance corresponds to a distance between one point of the vehicle 100 and one point of the structure. The one point of the vehicle 100 may be varied according to the implementations.

Next, when the measured distance is not included within a reference range, a movement command may be generated to the vehicle 100 so that the distance may fall within the reference range (S1630). For example, a destination of the vehicle 100 is set, and a movement command is generated to move the vehicle 100 to the destination. The movement command, a message to move the vehicle 100, is transmitted to the electronic components provided in the vehicle 100 and the engine, the brake, the gear, the steering wheel, and the like are operated in response to the movement command.

While moving or when movement is completed, the vehicle control device 810 extracts the light distribution pattern from the image, and performs the malfunction test using the extracted light distribution pattern (S1650).

Figure 17:
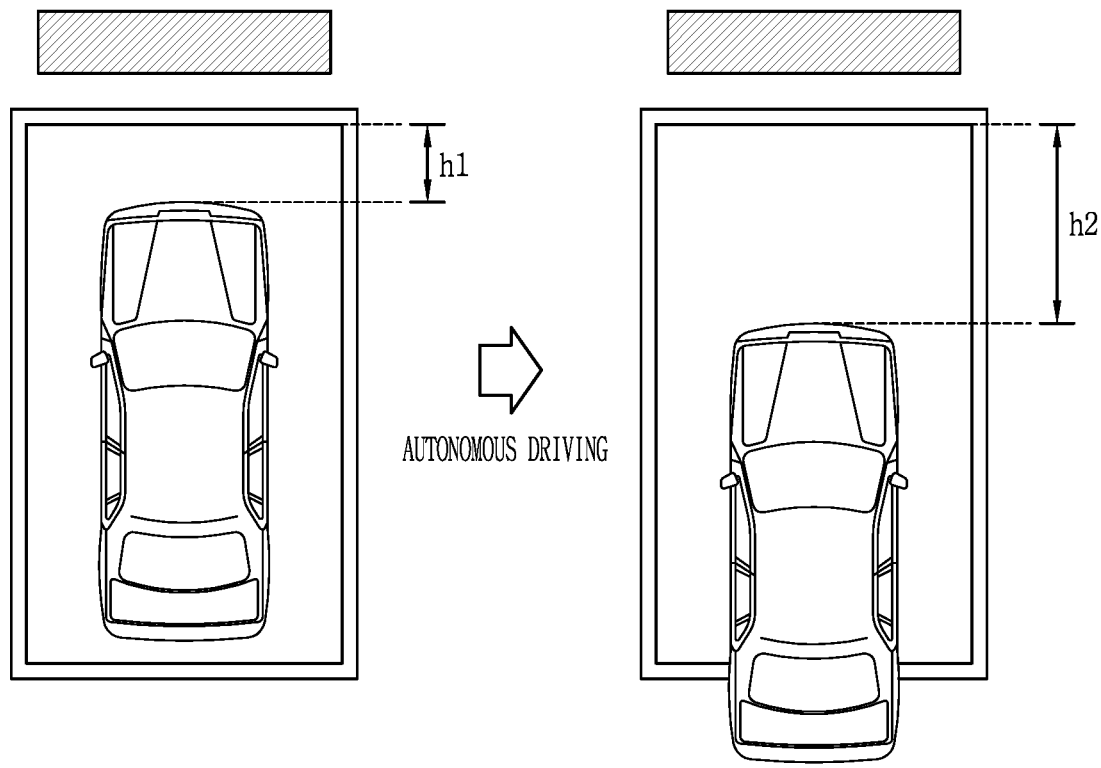

As shown in FIG. 17, when the distance (h1) is not included within the reference range, the malfunction test mode is not executed. In this instance, the vehicle 100 performs an autonomous driving to a position (h2) which satisfies the reference range, and then executes the malfunction test mode.

The vehicle 100 according to the present disclosure searches an optimal position for the malfunction test, and executes the malfunction test after performing an autonomous driving up to the searched position. Thus, since the malfunction test is executed under the optimal condition, the accuracy of the test is enhanced and the user's convenience can be improved.

Figure 18:
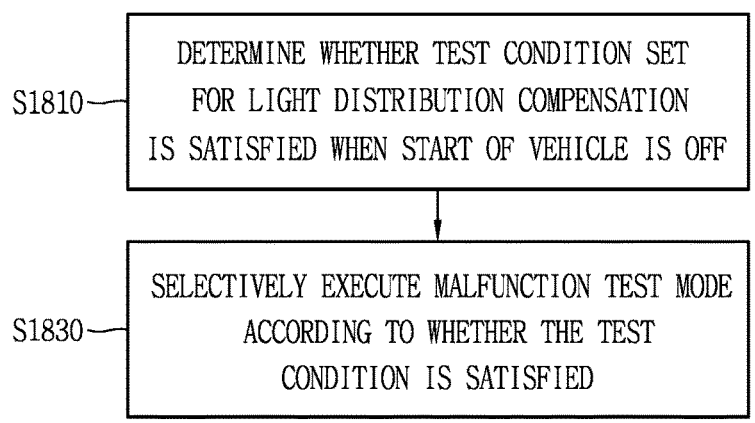
FIGS. 18 and 19 are diagrams illustrating examples of performing a malfunction test when a vehicle is started.
Figure 19:
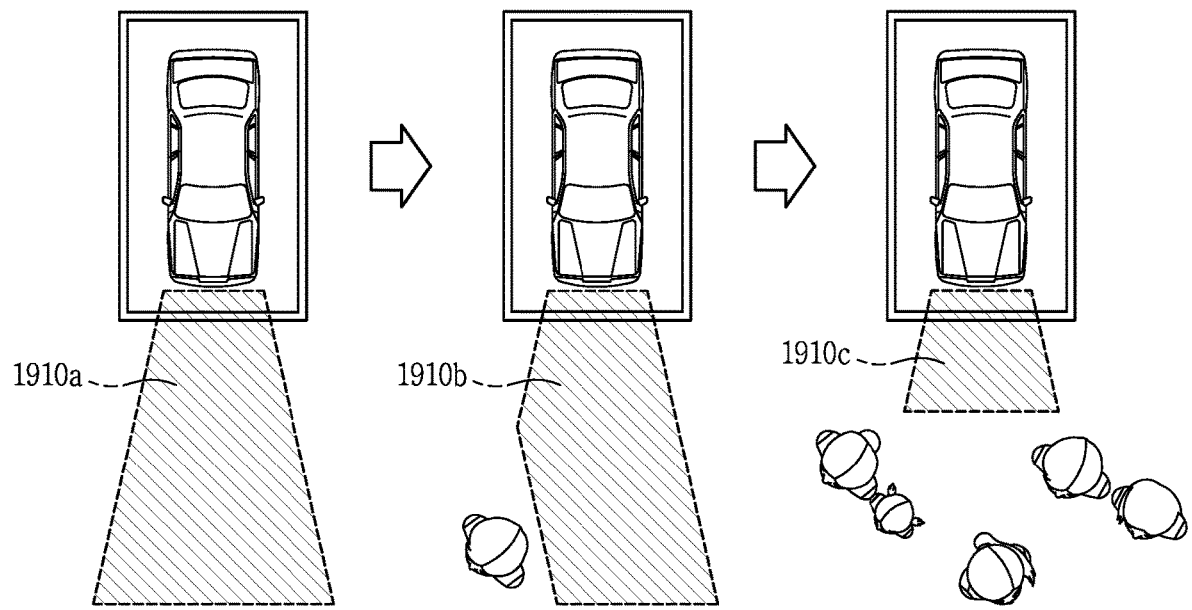

FIGS. 18 and 19 are views for explaining a vehicle control method for performing a malfunction test when a vehicle is started.

Referring to FIG. 18, when the vehicle 10 is started, the vehicle control device 810 determines whether the test condition is satisfied to perform the light distribution pattern compensation (S1810). In this instance, the vehicle control device 810 may determine whether or not the test condition is satisfied, based on the information received from at least one sensor provided in the vehicle 100.

Next, the malfunction test mode is selectively executed according to whether or not the test condition is satisfied (S1830).

When the starting of the vehicle 100 is turned on after a turn-off state, it may correspond to an optimal time to perform the malfunction test before driving is started. Thus, the vehicle control device 810 determines whether to perform the malfunction test when the starting of the vehicle 100 is turned on.

When the determination result reveals that it is not a situation to perform the malfunction test, the malfunction test is not performed. Unlike this, when the determination result reveals that it is a situation to perform the malfunction test, the malfunction test is performed, and at least one control is performed according to the result of test.

Before performing the malfunction test, the vehicle control device 810 may inform a user of at least one of the time required to execute the malfunction test and the type of the light distribution pattern executing the malfunction test. Moreover, an interface configured to accept or refuse execution of the malfunction test may be outputted through the display 840. The malfunction test may be executed or not according to the user input which is inputted through the interface.

In some implementations, the vehicle control device 810 may search a predetermined region where the malfunction test of the lamp 830 may be performed, using the images received from the camera 820.

For instance, as shown in FIG. 19, at least one of the size, the position and the shape of the predetermined regions 1910a-1910c may be varied according to the object or people located in front of the vehicle 100.

The vehicle control device 810 may set the predetermined region, and control the lamp 830 to form the test light distribution pattern which is a subject of the malfunction test on the predetermined region.

The type of the test light distribution pattern may be varied according to at least one of the size, the position and the shape of the predetermined region. For instance, when the predetermined region is set within a first range, only a low beam is tested, and when the predetermined region is set within a second range, only a high beam is tested. On the contrary, when the predetermined region includes the first and second ranges, both the low beam and the high beam may be tested.

Figure 20:
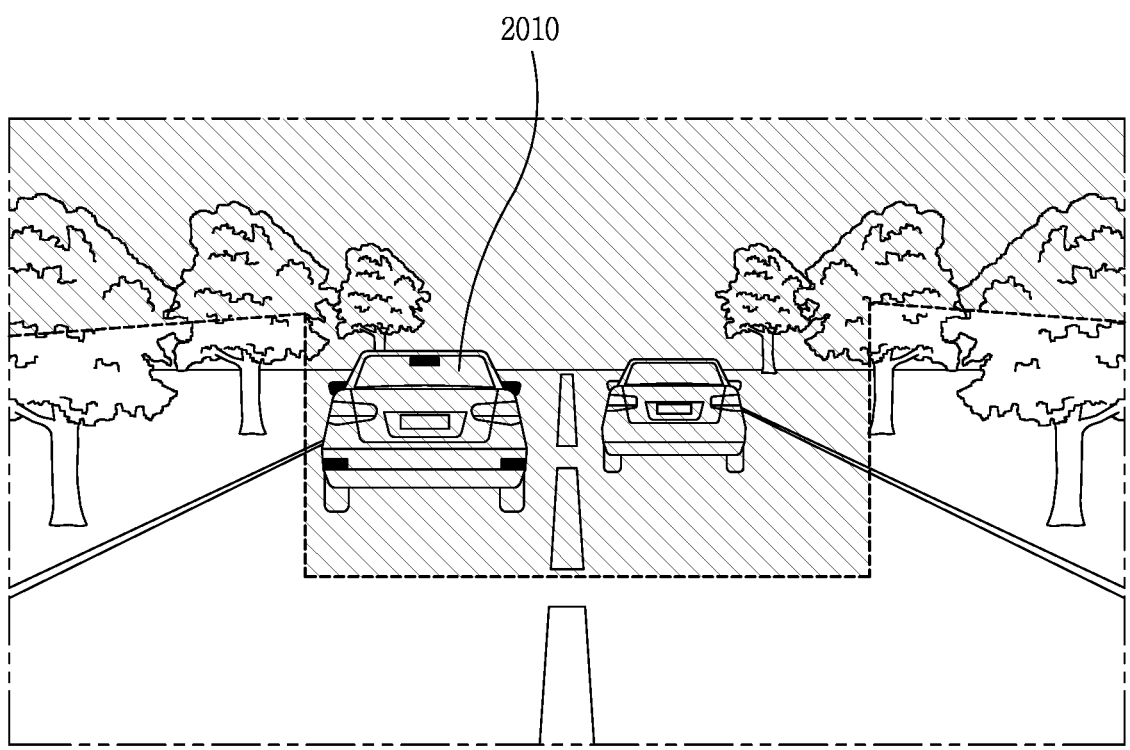
FIGS. 20 through 22 are diagrams illustrating examples of performing a malfunction test while driving a vehicle.
Figure 21:
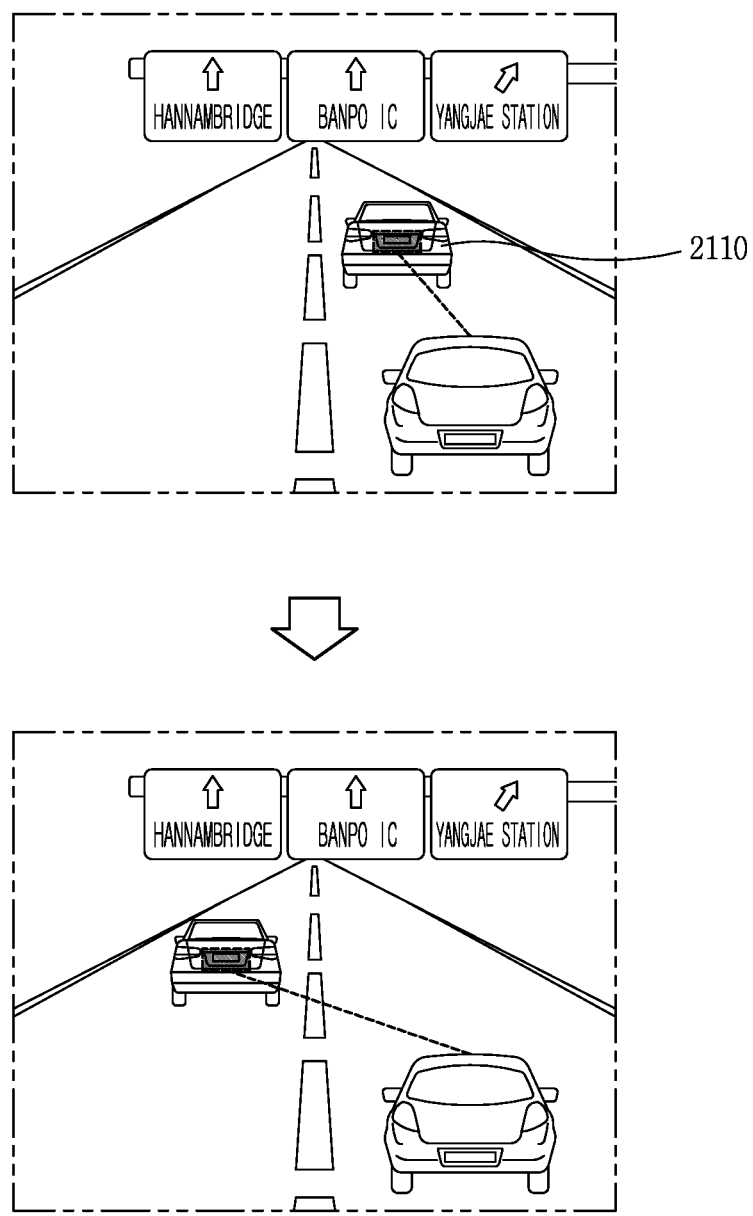
Figure 22:
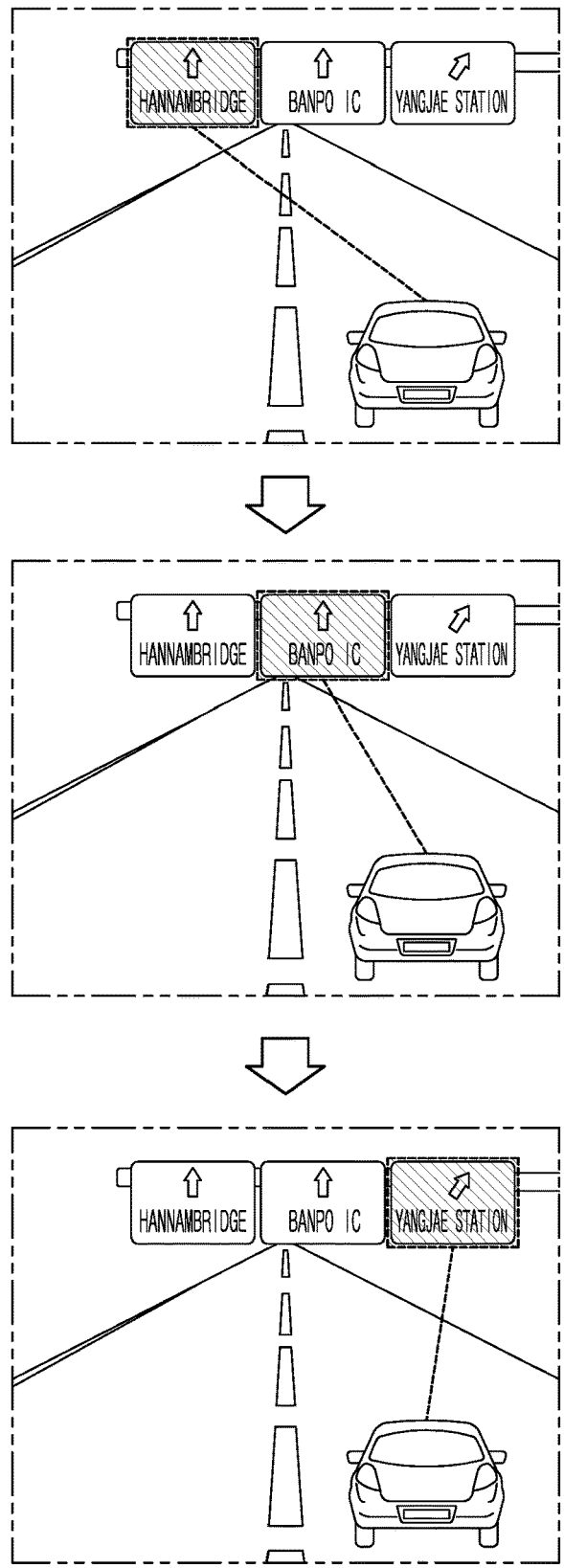

FIGS. 20 through 22 are views for explaining a vehicle control method for performing a malfunction test during a driving of a vehicle.

The vehicle control device 810 may determine whether or not the test condition for executing the malfunction test mode is satisfied during driving of the vehicle 100. When the malfunction test mode is executed, the vehicle control device 810 extracts the light distribution pattern using the image captured by the camera 820 and performs the malfunction test using the extracted light distribution pattern.

Other vehicles may be located in front of the vehicle 100 while driving the vehicle 100. In this instance, the vehicle control device 810 may confirm whether or not malfunction of the lamp 830 occurs by analyzing light reflected from other vehicles.

As shown in FIG. 20, the malfunction test may be performed by searching at least one of a side view mirror, a rearview mirror, a windshield, and a reflection board provided in the other vehicle 2010 from the images and analyzing light reflected from the searched region.

For instance, when light brighter than a reference brightness is detected on the rearview mirror of the other vehicle, the vehicle control device 810 may perform the lamp calibration so that the light may not be incident onto the rearview mirror.

For another instance, the vehicle control device 810 may analyze movement of a driver of other vehicle on the opposite lane using the image received from the camera 820, and perform the lamp calibration using the analysis result. When the driver of the other vehicle takes a gesture to cover his eyes, to frown, or to turn the head, the vehicle control device 810 may perform the lamp calibration, or control the lamp 830 to form the reference light distribution pattern.

Referring to FIG. 21, other vehicle may be located in front of the vehicle 100. The tail end of the other vehicle is provided with a number plate, and the number plate is configured to be recognizable at night.

The vehicle control device 810 may perform the malfunction test using the number plate of the other vehicle 2110. For example, the vehicle control device 810 controls the lamp 830 to irradiate a certain light onto the number plate of the other vehicle 2110 located in front of the vehicle 100. And it is possible to confirm the malfunction of the lamp using partial region corresponding to the number plate of the other vehicle among the whole region of the image. One part corresponding to the partial region on the reference light distribution pattern is searched, and whether or not the brightness of the searched partial region and that of the partial region are identical to each other may be determined. According to the determination result, the lamp calibration may be performed with respect to the partial region.

Also, it is possible to determine whether or not light is irradiated upon the partial region by comparing the brightness of the extracted partial region with the preset brightness. Through this, the lamp calibration may be executed with respect to the partial region when light is not irradiated though should be irradiated, or when light is irradiated though should not be irradiated.

The position of the number plate may be varied according to movement of the vehicle 100 or the other vehicle 2110. Thus, the region where the malfunction test is performed may be varied, and it is possible to perform the malfunction test with respect to various regions.

In some implementations, as the vehicle control device 810 is developed in the intelligence type, the lamp 830 can irradiate light of a predetermined brightness to a predetermined region by targeting, and as a result, the predetermined region can be brighter than other region. Thus, a driver can intuitively recognize the predetermined region which is brighter than other region. The light irradiated to the predetermined region is referred to as a 'targeting light'.

The predetermined region has an advantage in that it may draw a driver's attention, but may have a problem in that a dazzle may occur due to the targeting light when a person is located within the predetermined region. Moreover, when the lamp 830 is malfunctioned, there is a problem in that the targeting light is irradiated on the region where the targeting light should not be irradiated. Accordingly, it should be tested that whether the targeting light is correctly irradiated to the targeted point.

To this end, when a sign board is located in front of the vehicle 100, the vehicle control device 810 may control the lamp 830 to irradiate the targeting light to the sign board. Also, it is possible to test whether the targeting light is accurately irradiated by searching the region where the sign board is included from the image and detecting the brightness of the searched region.

Moreover, it is possible to perform the malfunction test in more detail by dividing the sign board into a plurality of parts, and controlling the lamp 830 to irradiate the targeting light onto each part in a consecutive order.

As shown in FIG. 22, when a sign board is located in front of the vehicle 100, the vehicle control device 810 may control the lamp 830 to irradiate a predetermined light onto different regions of the sign board in a consecutive order. Also, it is possible to confirm malfunction of the lamp 830 using partial region corresponding to the sign board among the whole region of the image.

For instance, the targeting light may be irradiated onto the first part for a time t1, and onto the second part for a time t2. The vehicle control device 810 may test whether the targeting light is accurately irradiated onto the first part using an image captured for the time t1. When a malfunction is confirmed, a lamp calibration may be performed with respect to the first part.

At night, a driver performs driving depending on the light distribution pattern which is formed by the lamp 830. Also, when an autonomous driving is performed, the sensors like the camera 820 sense various information depending on the light distribution pattern which is formed by the lamp 830. Thus, when the malfunction test mode is performed while driving of the vehicle, it may disturb a manual driving or an autonomous driving.

To prevent such a disturbance, the vehicle control device 810 according to the present disclosure performs the malfunction test within the scope of not disturbing a driving.

Figure 23:
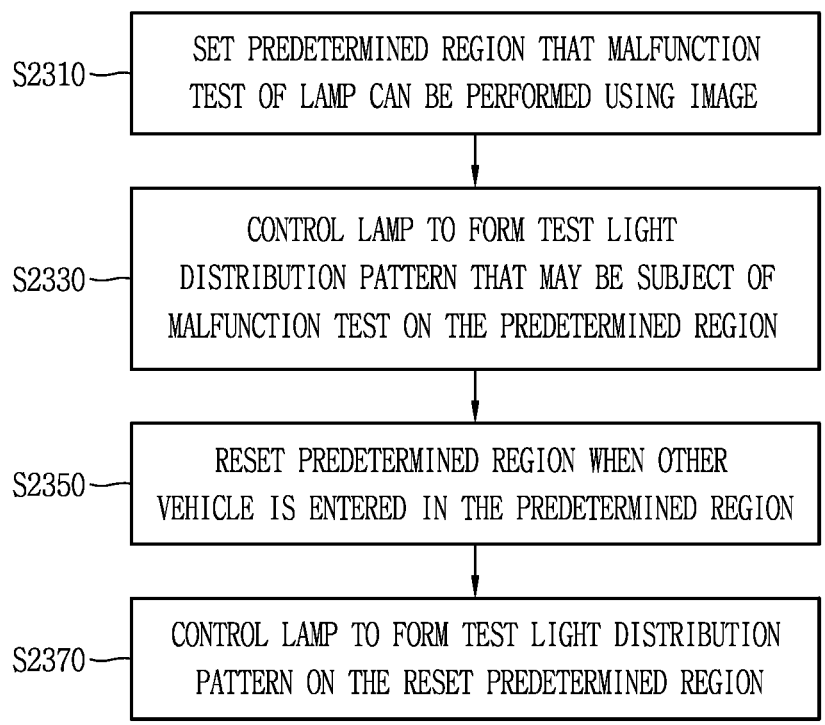
Figure 25:
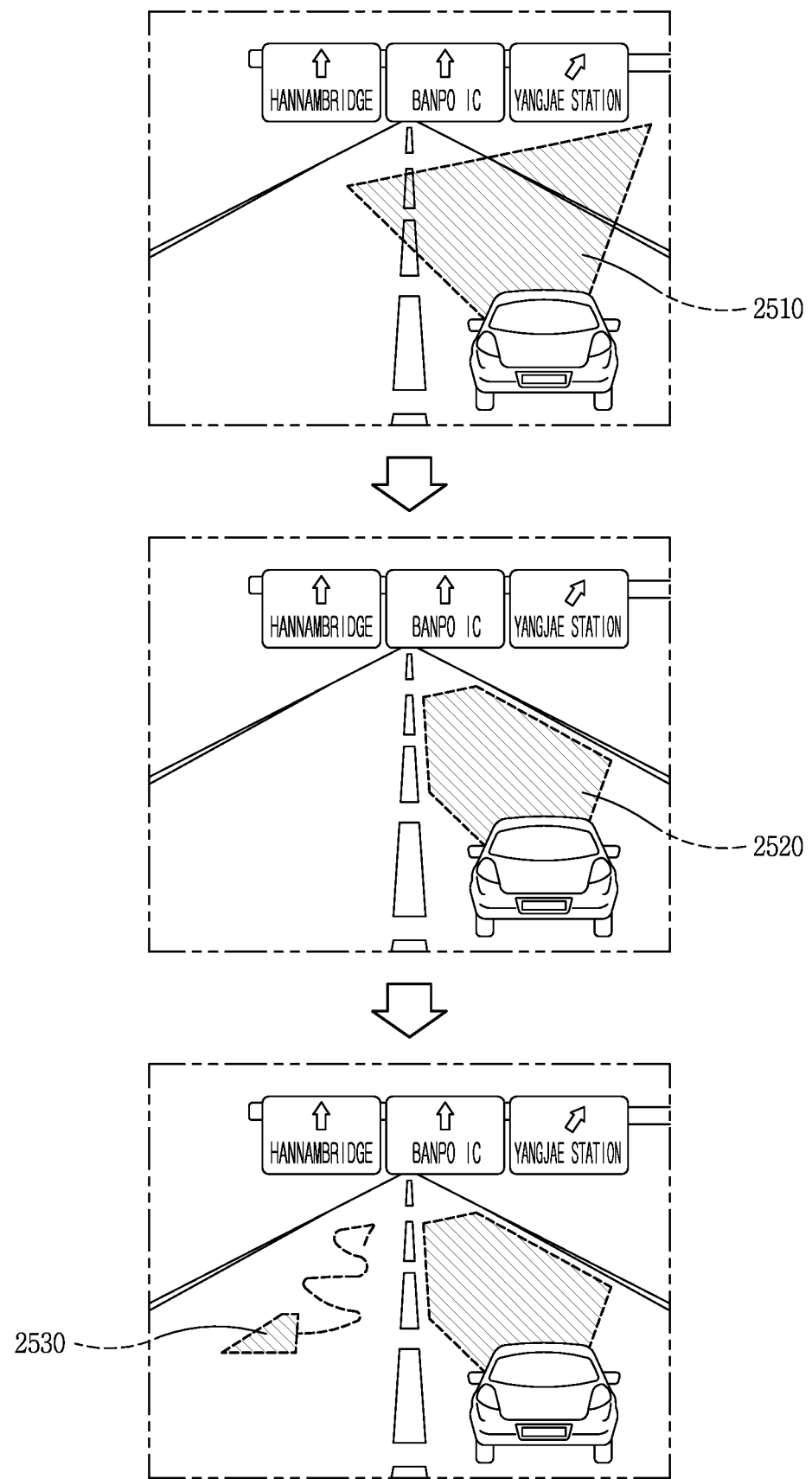

FIGS. 23 through 25 are views for explaining a vehicle control method for performing a malfunction test within the scope not to disturb driving of a vehicle.

Referring to FIG. 23, a predetermined region where the malfunction test of the lamp 830 can be performed is set using an image received from the camera 820 (S2310).

To perform the malfunction test, a predetermined light distribution pattern to be tested should be located in front of the vehicle 100. The predetermined light distribution pattern is referred to as a 'test light distribution pattern'.

As shown in FIG. 24, the front of the vehicle 100 is divided into a plurality of regions, and the regions may include at least one of a driving-mandatory region 2410, a test-inexecutable region 2420, and a test-executable region 2430. The lamp 830 may be controlled to form the test light distribution pattern onto the test-executable region 2430.

The driving-mandatory region 2410 is defined as a region where light is essentially irradiated for driving, since the vehicle 100 is travelling. The driving—mandatory region 2410 may be varied according to the speed of the vehicle 100, whether the vehicle 100 is travelling in an autonomous driving mode, the type of a road where the vehicle 100 is travelling, and the sensible range of a sensor provided in the vehicle 100.

The test-inexecutable region 2420 is defined as a region where irradiation of light is not allowed for safety purpose. For instance, when other vehicle is located in front of the vehicle 100, the test-inexecutable region may be set based on one point of the windshield so that light is not irradiated onto the windshield of the other vehicle. The test-inexecutable region 2420 may be varied according to the type and location of an object. The object includes a pedestrian, a rider, and other vehicle.

The test-executable region 2430 is defined as a region where the test light distribution pattern can be formed. The test-executable region 2430 may include the driving-mandatory region 2410, and a region which is not the test-inexecutable region 2420.

The vehicle control device 810 may set the test-executable region 2430 as the predetermined region.

Next, the lamp 830 is controlled to form the test light distribution pattern which may be a subject of the malfunction test on the predetermined region (S2320).

In this instance, the light distribution pattern which is formed on a remaining region other than the predetermined region may be maintained.

Before and after the malfunction test is executed, the light distribution pattern displayed on the driving-mandatory region may be identical. Unlike this, a test light distribution pattern is formed on the test-executable region.

For instance, as shown in FIG. 25, the lamp 830 may form a first light distribution pattern 2510 while driving. Thereafter, when a malfunction test mode is executed, the driving-mandatory region and the test-executable region are set. The mandatory light distribution pattern 2520 is maintained as it is, as a part displayed on the driving-mandatory region among the first light distribution pattern 2510. However, the selection light distribution pattern, as a part displayed on the test light distribution region, is removed. The test light distribution pattern 2530 is formed on the test light distribution region, instead of the selection light distribution pattern.

As such, when the malfunction test mode is executed, the test light distribution pattern 2530 is formed on the test-executable region.

The type of the test light distribution pattern may be varied according to at least one of the speed of the vehicle 100 and the size of the test light distribution region. Moreover, as described with reference to FIG. 13, the test light distribution pattern may be selected according to various conditions.

The vehicle control device 810 may perform a malfunction test with respect to the test light distribution pattern displayed on the test-executable region 2430, and execute a lamp calibration according to the test result.

In some implementations, when other vehicle is entered in the predetermined region, the set region may be reset (S2530). This is why the test-executable region is displayed in front of the vehicle 100 due to the other vehicle. As such, the test-executable region is reset so that the test-inexecutable region may not be included in the test-executable region.

Next, the lamp 830 is controlled to form the test light distribution pattern on the predetermined region which has been reset (S2370). As the test-executable region is reset, the type of the test light distribution pattern may be varied.

In some implementations, when other vehicle is entered in the test-executable region, the vehicle control device 810 temporarily stops the malfunction test, and may control the lamp 830 not to form the test light distribution pattern. Thereafter, when the other vehicle disappears, the malfunction test mode which has been temporarily stopped is performed again, and the test light distribution pattern may be displayed again.

In some implementations, the vehicle control device 810 according to the present disclosure may guide the light distribution pattern formed by the lamp 830 to a user.

Figure 26:
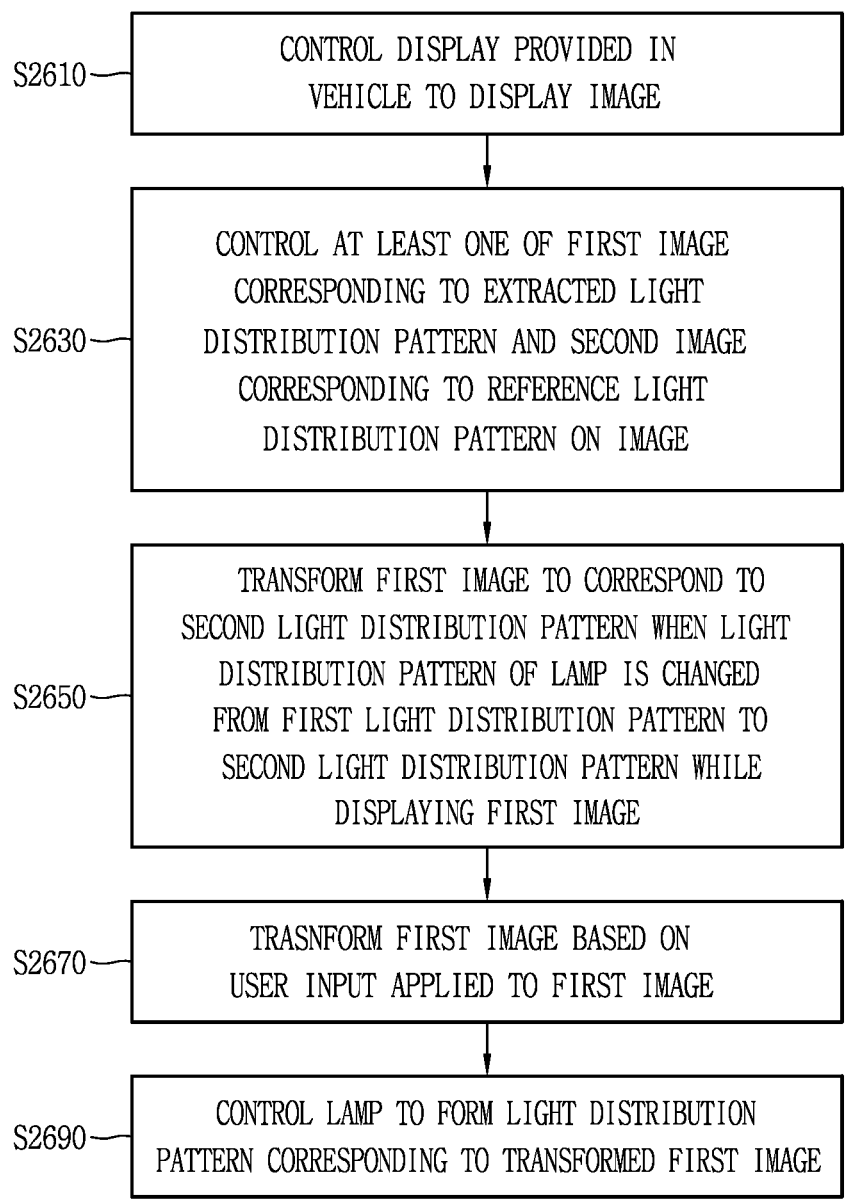
FIGS. 26 and 27 are diagrams illustrating examples of guiding light distribution patterns formed by a lamp to a user.
Figure 27:
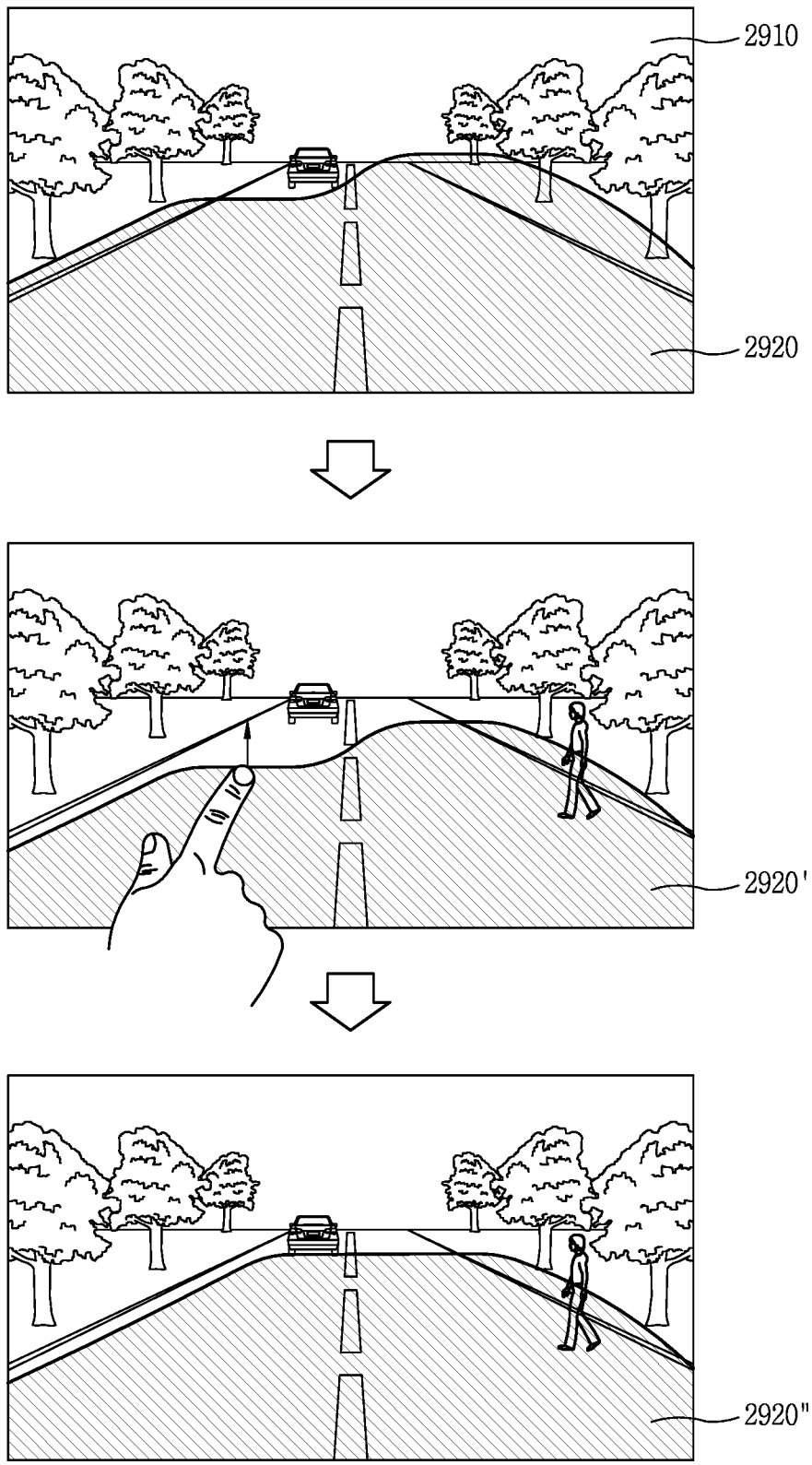

FIGS. 26 and 27 are views for explaining a vehicle control method for guiding light distribution patterns formed by a lamp to a user.

Referring to FIG. 26, the vehicle control device 810 may control the display 840 provided in the vehicle 100 to display the image received from the camera 820 (2610).

Figure 29:
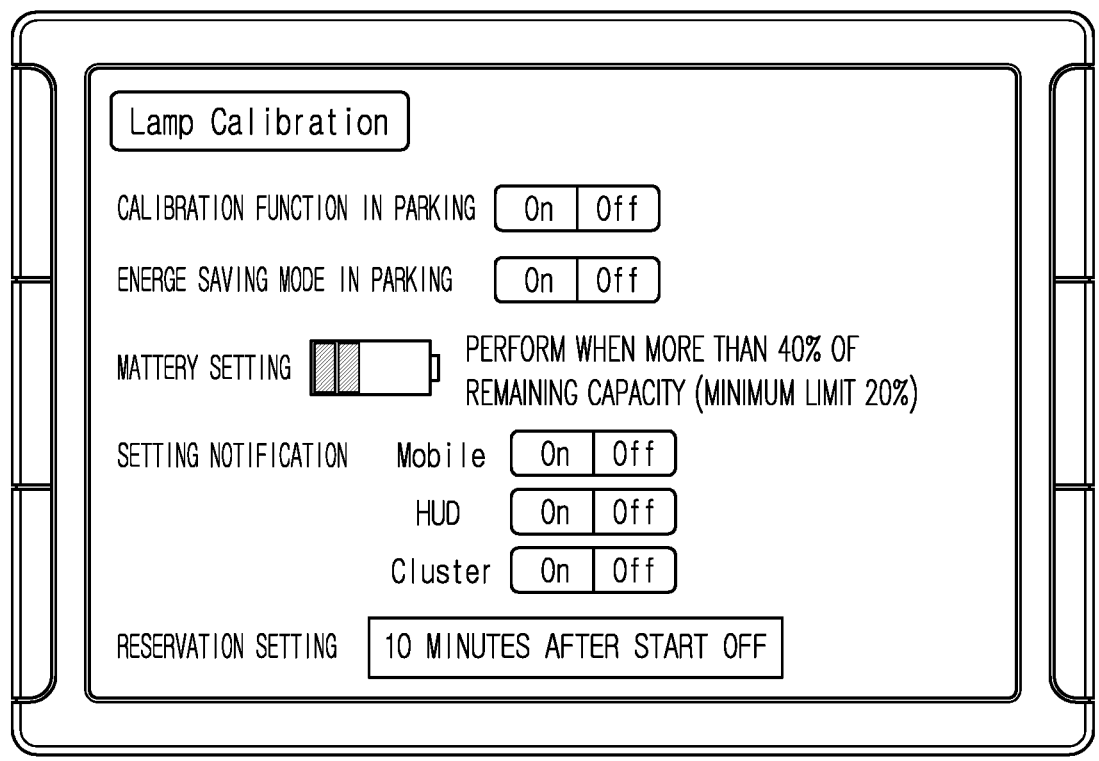
FIG. 29 is a diagram illustrating an example of a vehicle control method for outputting information related to a malfunction test of a lamp.

As if the image captured by a rear camera of the vehicle 100 is displayed on the display 840 when a reverse gear is selected, the image captured by a front camera of the vehicle 100 may be displayed on the display 840 when the malfunction test mode is executed. As shown in FIG. 29, the image 2910 captured by the front camera may be displayed on the display 840.

Next, the display 840 may be controlled to display at least one of a first image corresponding to the extracted light distribution pattern and a second image corresponding to the reference light distribution pattern on the image.

The vehicle control device 810 may extract the light distribution pattern from the image 2910, and display the first image 2920 corresponding to the extracted light distribution pattern on the image 2910. A user may confirm how the light distribution pattern is formed through the first image 2920.

In some implementations, a second image corresponding to a reference light distribution pattern to be compared with the extracted light distribution pattern may be displayed together with the first image 2920.

Next, when the light distribution pattern of the lamp 830 is changed from the first light distribution pattern to the second light distribution pattern while the first image is displayed, the first image may be changed so as to correspond to the second light distribution pattern (S2650). The vehicle control device 810 may transform the first image so as to correspond real time to the light distribution pattern which is being formed by the lamp 830 (2920->2920').

In some implementations, the display 840 is comprised of a touch screen and can sense a touch input applied to the touch screen.

The vehicle control device 810 may transform the first image based on a user input applied to the first image (S2670). For instance, as shown in FIG. 27, when a drag input is applied to the first image 2920', the vehicle control device 810 may transform the first image based on the drag input (2920'->2920").

Next, the lamp 830 is controlled to form a light distribution pattern corresponding to the transformed first image (S2690). A user can select a light distribution pattern which is optimized to him, thereby enhancing the user convenience.

Figure 28:
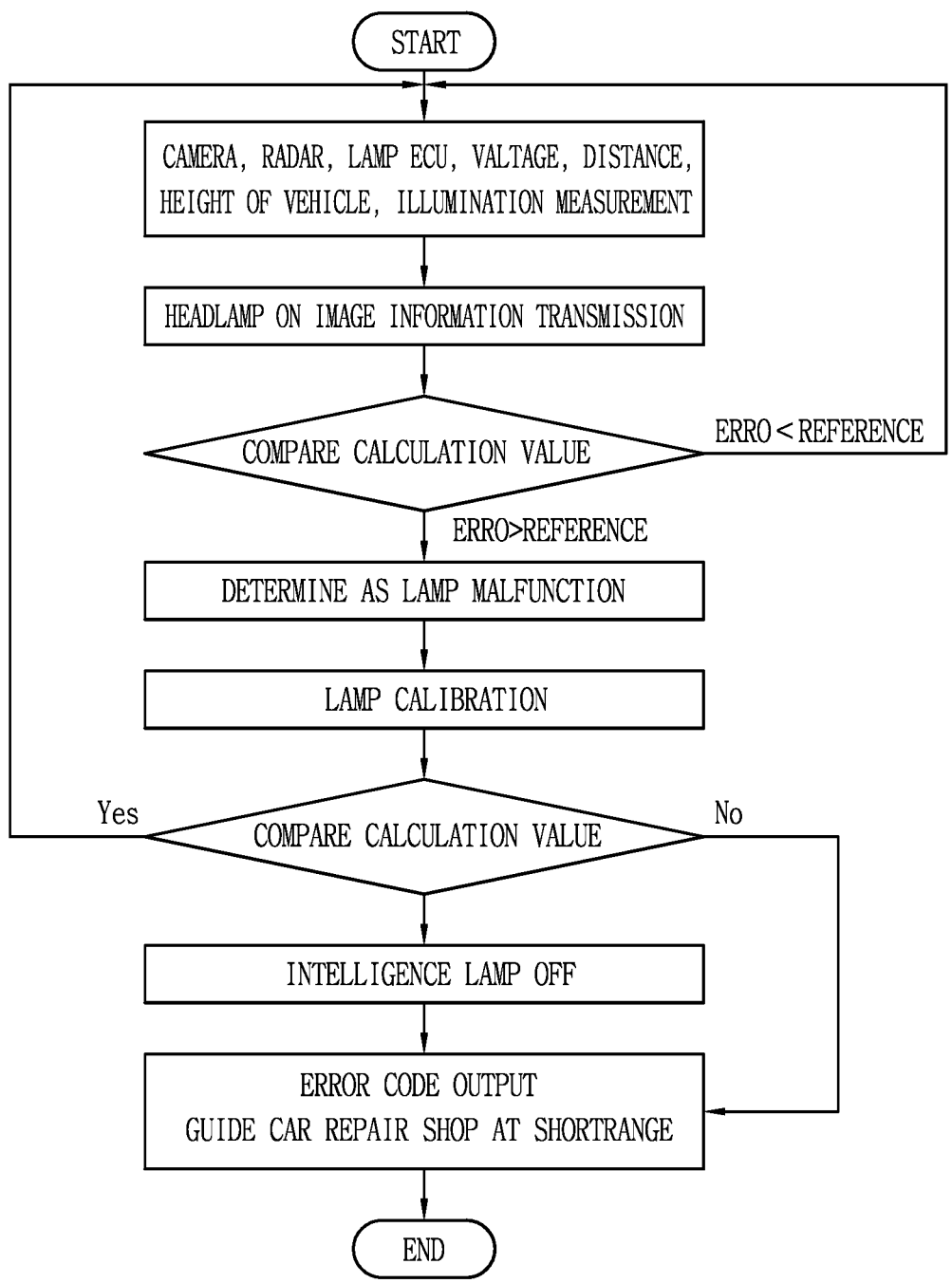
FIG. 28 is a flowchart illustrating an example of a vehicle control method according to an implementation of the present disclosure.

FIG. 28 is a flowchart illustrating in summary a vehicle control method according to an implementation of the present disclosure.

The vehicle control device 810 may acquire vehicle driving information based on information received from a camera, a radar, and the like. The vehicle driving information may include a voltage transmitted to the lamp 830, the distance between the vehicle 100 and an object located in front of the vehicle 100, the distance between one point of the vehicle 100 and a ground, and the brightness (luminous intensity) in front of the vehicle 100.

Thereafter, the lamp 830 is controlled to form a test light distribution pattern, and a comparison of the test light distribution pattern with the reference light distribution pattern is performed using the image received from the camera 820. According to the comparison result, the lamp calibration may be selectively performed.

When an error between the test light distribution pattern and the reference light distribution pattern is larger than a reference value as a result of the lamp calibration, a specific light distribution mode corresponding to the reference light distribution pattern is turned off. The specific light distribution mode is restricted in its execution until the lamp 830 is repaired. Moreover, the vehicle control device 810 may provide to a user notification information informing that the lamp 830 is required to be repaired.

FIG. 29 is a view for explaining a vehicle control method for outputting information related to a lamp malfunction test.

The vehicle control device 810 may provide a user interface related to the malfunction test mode. The user interface may be provided through the display 840 provided in the vehicle 100.

A user can set or reset the test condition that the malfunction test mode should be performed using the user interface. Moreover, the type of the light distribution pattern to be tested in the malfunction test mode may be set or reset.

In order to smoothly execute the malfunction test mode, it is necessary for the battery of the vehicle to be sufficiently charged. Thus, the vehicle control device may not perform the malfunction test mode when the residue of the battery is lower than a reference value even in a case where the test condition is satisfied.

What is claimed is:

1. A method for controlling a vehicle including at least one camera and a lamp, the method comprising:
   controlling the at least one camera to capture at least one image of an area in front of the vehicle;
   extracting, from the at least one image, a light distribution pattern formed by the lamp in the area in front of the vehicle; and
   performing at least one control related to the extracted light distribution pattern, based on a comparison result obtained by comparing the extracted light distribution pattern with a reference light distribution pattern,
   wherein performing the at least one control related to the extracted light distribution pattern is performed based on a determination that a vertical structure is located in front of the vehicle,
   wherein the method further comprises:
   determining that a distance between the vertical structure and a first part of the vehicle is a first distance, and
   generating a control command for the vehicle to move the vehicle so that the distance between the vertical structure and the first part of the vehicle is a second distance that satisfies a predetermined condition, and
   wherein extracting, from the at least one image, the light distribution pattern formed by the lamp is performed after completion of the movement of the vehicle by the control command.

2. The method of claim 1, wherein performing the at least one control related to the extracted light distribution pattern comprises:
   based on a determination that the extracted light distribution pattern does not match the reference light distribution pattern, controlling the lamp to perform a light distribution pattern compensation that transforms the extracted light distribution pattern to the reference light distribution pattern.

3. The method of claim 2, wherein controlling the lamp to perform the light distribution pattern compensation comprises:
   activating or deactivating at least one or more light sources of the lamp to transform the extracted light distribution pattern to the reference light distribution pattern.

4. The method of claim 2, wherein controlling the lamp to perform the light distribution pattern compensation comprises:
   driving at least one or more driving units of the lamp to transform the extracted light distribution pattern to the reference light distribution pattern.

5. The method of claim 2, further comprising:
based on a determination that controlling the lamp to perform the light distribution pattern compensation does not satisfy at least one criteria related to executability of the light distribution compensation, controlling the lamp to form a basic light distribution pattern other than the reference light distribution pattern.

6. The method of claim 5, further comprising:
based on a determination that controlling the lamp to perform the light distribution pattern compensation does not satisfy the at least one criteria related to the executability of the light distribution compensation, restricting execution of a lamp control mode corresponding to the reference light distribution pattern.

7. The method of claim 5, further comprising:
based on a determination that controlling the lamp to perform the light distribution pattern compensation does not satisfy the at least one criteria related to the executability of the light distribution compensation, outputting notification information to at least one of a mobile terminal or a display provided in the vehicle.

8. The method of claim 1, wherein performing the at least one control related to the extracted light distribution pattern further comprises:
selecting a reference light distribution pattern among a plurality of reference light distribution patterns; and
comparing the selected reference light distribution pattern with the extracted light distribution pattern.

9. The method of claim 8, wherein the selected reference light distribution pattern depends on a driving state of the vehicle.

10. The method of claim 1, wherein performing the at least one control related to the extracted light distribution pattern is performed according to whether an information received from a sensor provided in the vehicle satisfies a predetermined condition related to adjusting the light distribution pattern.

11. The method of claim 10, further comprising controlling the lamp, based on the predetermined condition being satisfied, to operate according to a lamp scenario for consecutively forming different light distribution patterns within a predetermined time,
wherein a plurality of light distribution patterns is extracted from a plurality of images captured during the predetermined time, and
wherein each of the plurality of light distribution patterns is compared with a different reference light distribution pattern, respectively.

12. The method of claim 11, further comprising:
based on the information received from the sensor satisfying a first predetermined condition, operating the lamp according to a first lamp scenario corresponding to the first predetermined condition; and
based on the information received from the sensor satisfying a second predetermined condition, operating the lamp according to a second lamp scenario corresponding to the second predetermined condition.

13. The method of claim 11, further comprising:
based on an object being detected in front of the vehicle while the lamp is controlled to operate according to a lamp scenario:
stopping the control of the lamp to operate according to the lamp scenario; and
controlling the lamp to form a basic light distribution pattern.

14. The method of claim 1, further comprising:
controlling a display provided in the vehicle to display the at least one image captured by the at least one camera; and
controlling the display to display, on the at least one image that is displayed on the display, at least one of a first image corresponding to the extracted light distribution pattern or a second image corresponding to the basic light distribution pattern.

15. The method of claim 1, further comprising:
determining, based on the least one image captured by the at least one camera, a first geographic region in which the comparison result is to be obtained by comparing the extracted light distribution pattern with the reference light distribution pattern; and
controlling the lamp to form, on the first geographic region, a test light distribution pattern that is to be utilized in obtaining the comparison result by comparing the extracted light distribution pattern with the reference light distribution pattern.

16. The method of claim 15, wherein a type of the test light distribution pattern is varied depending on at least one of a speed of the vehicle or a size of the first geographic region.

17. The method of claim 15, wherein controlling the lamp to form, on the first geographic region, the test light distribution pattern further comprises:
controlling the lamp to maintain, on a remaining region of the area in front of the vehicle other than the first geographic region, the light distribution pattern that was formed by the lamp in the area in front of the vehicle.

18. The method of claim 15, further comprising:
based on a determination that a second vehicle enters into the first geographic region, determining a second geographic region in which the comparison result is to be obtained by comparing the extracted light distribution pattern with the reference light distribution pattern; and
controlling the lamp to form the test light distribution pattern on the second geographic region.

* * * * *